United States Patent
Kimura

(10) Patent No.: US 7,460,460 B2
(45) Date of Patent: Dec. 2, 2008

(54) OBJECTIVE OPTICAL SYSTEM, OPTICAL PICKUP APPARATUS AND OPTICAL INFORMATION RECORDING AND REPRODUCING APPARATUS

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 613 days.

(21) Appl. No.: 11/062,004

(22) Filed: Feb. 18, 2005

(65) Prior Publication Data
US 2005/0190681 A1   Sep. 1, 2005

(30) Foreign Application Priority Data
Feb. 27, 2004   (JP) ............... 2004-053859

(51) Int. Cl.
*G11B 7/135* (2006.01)

(52) U.S. Cl. ............... 369/112.23; 369/112.13

(58) Field of Classification Search ...............
369/112.23–112.26, 112.05, 112.08, 112.13
See application file for complete search history.

(56) References Cited

U.S. PATENT DOCUMENTS

| | | | | |
|---|---|---|---|---|
| 5,920,532 | A * | 7/1999 | Yagi et al. | 369/53.22 |
| 6,166,854 | A * | 12/2000 | Katsuma | 359/569 |
| 6,687,209 | B2 * | 2/2004 | Ota et al. | 369/112.08 |
| 7,206,276 | B2 | 4/2007 | Kimura et al. | |
| 2004/0114254 | A1 * | 6/2004 | Kimura et al. | 359/719 |
| 2004/0213134 | A1 * | 10/2004 | Takada et al. | 369/112.08 |

FOREIGN PATENT DOCUMENTS

| | | |
|---|---|---|
| EP | 1 154 417 | 11/2001 |
| EP | 1 304 689 | 4/2003 |
| EP | 1 422 703 | 5/2004 |
| EP | 1 462 696 | 9/2004 |
| WO | WO 02/082437 | 10/2002 |

OTHER PUBLICATIONS

Katayama R. et al. "Dual-Wavelength Optical Head with a Wavelength-Selective Filter for 0.6- and 1.2-mm-thick-Substrate Optical Disks", Applied Optics, Optical Society of America, Washington, DC, US, vol. 38, No. 17, 10, pp. 3778-3786, Jun. 10, 1999.
European Search Report issued in the corresponding foreign application No. EP 05 25 1013.

* cited by examiner

*Primary Examiner*—Tan Xuan Dinh
*Assistant Examiner*—Henok G Heyi
(74) *Attorney, Agent, or Firm*—Cohen Pontani Lieberman & Pavane LLP

(57) ABSTRACT

An objective optical system for use in an optical pickup apparatus for converging first and second parallel light fluxes includes: a first lens group having a phase structure; and a second lens group, wherein the first lens group and the second lens group are arranged in the objective optical system in this order from a longer conjugate distance side of the objective optical system, and a wavefront aberration of the first lens group $W_{L1\lambda 1}$, a wavefront aberration of the second lens group $W_{L2\lambda 1}$, a magnification of the second lens group M, a wavefront aberration of the second lens group $W_{L2\lambda 2}$, a wavefront aberration of the objective optical system $W_{OBJ\lambda 2}$ are satisfy predescribed expressions.

16 Claims, 8 Drawing Sheets

OBJECTIVE OPTICAL SYSTEM, OPTICAL PICKUP APPARATUS AND OPTICAL INFORMATION RECORDING AND REPRODUCING APPARATUS

FIELD OF THE INVENTION

The present invention relates to an objective optical system, an optical pickup apparatus and an optical information recording and reproducing apparatus.

BACKGROUND OF THE INVENTION

In a field of optical pickup apparatus, conversion into a shorter wavelength of a laser light source used as a light source for reproducing of information recorded on an optical disk, and for recording information on an optical disk has been advanced in recent years. A laser light source with wavelength 405 nm such as a violet semiconductor laser and a violet SHG laser wherein a wavelength of an infrared semiconductor laser is converted by the use of second harmonic generation, for example, have been put to practical use.

When these violet laser light sources are used, information of 15-20 GB can be recorded in an optical disk having a diameter of 12 cm in the case of using an objective lens having a numerical aperture (NA) that is the same as that of DVD (digital versatile disc), and when NA of the objective lens is enhanced to 0.85, information of 23-25 GB can be recorded for the optical disk having a diameter of 12 cm. Hereafter, in the present specification, an optical disk using a violet laser light source and a magneto-optical disk are generically called "a high density optical disc".

Incidentally, in recording and/or reproducing the high density optical disc using an objective lens having NA 0.85, comatic aberration caused by an inclination (skew) of the optical disk is increased, and therefore, an amount of comatic aberration caused by a skew is reduced by designing a protective layer to be thinner than in the case of DVD (to be 0.1 mm when the protective layer for DVD is 0.6 mm).

However, only a capability to conduct recording and reproducing of information properly for the high density optical disc is not a sufficient value as a product of an optical disk player and a recorder. In the present time, when it is taken into consideration that DVD and CD (compact disc) on which various types of information are recorded actually are on the market, only a capability to conduct recording and reproducing of information for the high density optical disc is not sufficient, and a capability, for example, to conduct recording and reproducing of information equally and properly also for DVD and CD already owned by a user leads to enhancement of a commercial value as an optical disk player for a high density disc and a recorder. From such background, the optical pickup apparatus equipped on the optical disk player for a high density disc and a recorder is required to have capability to conduct recording and reproducing of information properly while maintaining compatibility for any of a high density optical disc, DVD and further CD.

As a method to conduct recording and reproducing of information properly while maintaining compatibility for any of a high density optical disc, DVD and further CD, there is considered a method to selectively switch an optical system for a high density optical disc and an optical system for DVD and CD, depending on recording density of the optical disk to be subjected to recording and reproducing in terms of information. However, this method requires a plurality of optical systems, which is disadvantageous for downsizing and it causes cost increase.

Therefore, for achieving low cost by simplifying the structure of an optical pickup apparatus, it is preferable to provide a common optical system for a high density optical disc and that for DVD and CD even in the optical pickup apparatus having compatibility, and thereby to reduce, to the Utmost, the number of optical parts which constitute the optical pickup apparatus. Providing common objective optical systems which are arranged to face the optical disk is most advantageous for simplification of the structure of the optical pickup apparatus and for low cost thereof. Incidentally, for obtaining common objective optical systems for plural types of optical disks wherein wavelengths for recording and reproducing are different, it is necessary to form a phase structure having wavelength-dependency for spherical aberration on the objective optical system.

In Patent Document 1, there are described an objective optical system which is of the two-group structure having a diffractive structure as a phase structure and can be used commonly for the high density optical disc and for conventional DVD and CD and an optical pickup apparatus that is equipped with the objective optical system.

The objective optical system which is of the two-group structure described in Patent Document 1 has the structure wherein a working distance for the optical disk having thick protective layer such as DVD and CD is secured by making a light converging element on the optical disk side to shoulder the most of paraxial power, and vignetting of a ray of light by a portion of steps of the diffractive structure is prevented and transmittance is improved by forming, on an aberration correcting element on the light source side, a diffractive structure as a phase structure.

(Patent Document 1) European Patent Application Publication No. 1304689

For manufacturing efficiently an efficient two-group-structured compatible objective system, it is necessary to obtain lenses each being kept within an aberration range at a certain extent and to put these lens groups together. When aberration of each lens group is great, problems stated below are caused in an assembling process.

For example, when large comatic aberrations remain in each lens group, it is necessary to eliminate these comatic aberrations through adjustment in assembly, to make the lens group to be used as the compatible objective optical system. However, even in the case where the comatic aberration is corrected for the wavelength on one side through adjustment in assembly, there still is a high possibility that the comatic aberration still remains for the wavelength on the other side, and the lens group cannot be used as the compatible objective optical system.

Further, the aforesaid confirmation of comatic aberration for all working wavelengths for assembly of each lens group lowers manufacturing efficiency conspicuously, which leads to an increase of manufacturing cost, and causes a fear to preclude mass production.

The objective optical system described in the Patent Document 1 does not disclose any solution for the problems mentioned above. Therefore, a two-group-structured compatible objective optical system having sufficient performance for plural working wavelengths cannot be manufactured efficiently and at low cost.

SUMMARY OF THE INVENTION

An object of the invention is to provide a two-group-structured objective optical system with a phase structure capable of conducting properly recording and/or reproducing of information for plural optical disks each having a different recording density which can be manufactured efficiently and at low cost to be of an excellent capability for all working wavelengths, an optical pickup apparatus equipped with the objective optical system and an optical information recording and reproducing apparatus.

To solve the problems stated above, in the objective optical system related to the invention, an objective optical system includes a first lens group and a second lens group, and the first lens group has therein a phase structure, wherein wavefront aberration $W_{L1\lambda1}$ of the first lens group for a parallel light flux with wavelength $\lambda_1$, wavefront aberration $W_{L2\lambda1}$ of the second lens group for the light flux with wavelength $\lambda_1$, magnification M of the second lens group in the case where $W_{L2\lambda1}$ takes the minimum value, wavefront aberration $W_{L2\lambda2}$ of the second lens group for a light flux with wavelength $\lambda_2$ at magnification M, wavefront aberration $W_{OBJ\lambda1}$ of the objective optical system for a parallel light flux with wavelength $\lambda_1$, and wavefront aberration $W_{OBJ\lambda2}$ of the objective optical system for a parallel light flux with wavelength $\lambda_2$ satisfy predetermined expressions.

In the present specification, an optical disk employing a violet semiconductor laser and a violet SHG laser as a light source for recording and reproducing of information is generically called "a high density disc" which includes also an optical disk (for example, HD DVD) having a standard of protective layer thickness of about 0.6 mm and conducting recording and reproducing of information with an objective optical system having NA of 0.65-0.67 in addition to an optical disk (for example, a Blu-ray disc) having a standard of protective layer thickness of about 0.1 mm and conducting recording and reproducing of information with an objective optical system having NA of 0.85. Further, in addition to the optical disk having, on its information recording surface, the protective layer of that kind, an optical disk having, on its information recording surface, a protective layer whose thickness is about several microns—several tens microns and an optical disk wherein its protective layer or a thickness of the protective layer is zero. Further, in the present specification, the high density optical disc includes a magneto-optical disk that employs a violet semiconductor laser or a violet SHG laser as a light source for recording and reproducing of information.

Further, in the present specification, DVD is a general term of an optical disk in DVD series such as DVD-ROM, DVD-Video, DVD-Audio, DVD-RAM, DVD-R, DVD-RW, DVD+R, and DVD+RW, and CD is a general term of an optical disk in CD series such as CD-ROM, CD-Audio, CD-Video, CD-R and CD-RW.

BRIEF DESCRIPTION OF THE DRAWINGS

Each of FIG. 2(a)

Each of FIG. 3(a)

Each of FIG. 4(a)

DETAILED DESCRIPTION OF THE INVENTION

Figure 1:
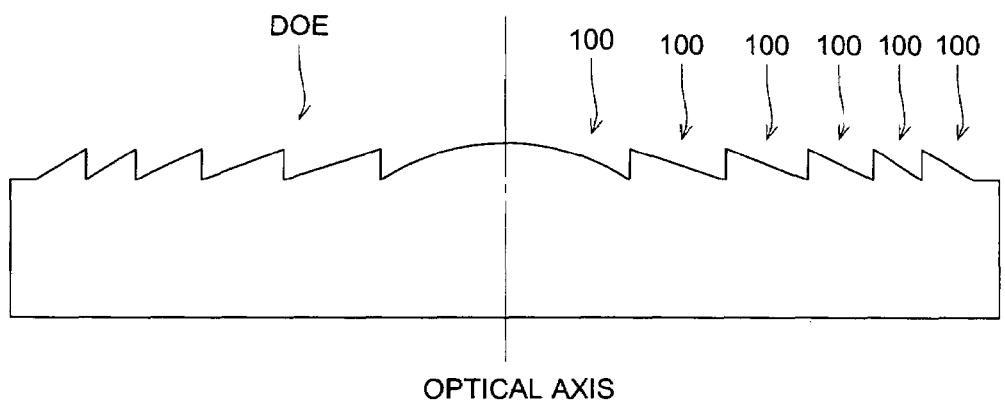
FIG. 1 is a side view showing an example of a diffractive structure.

The preferred embodiment of the invention will be explained next.

The structure described in Item 1 is an objective optical system for use in an optical pickup apparatus for converging a parallel light flux having a diameter $\phi_1$ and a first wavelength $\lambda_1$ on an information recording surface of the first optical disk having a protective layer with a thickness $t_1$ within numerical aperture $NA_1$, and converging a parallel light flux having a diameter $\phi_2$ ($\phi_2 > \phi_1$) and a second wavelength $\lambda_2$ ($\lambda_2 > \lambda_1$) on an information recording surface of the second optical disk having a protective layer with a thickness $t_2$ ($t_2 > t_1$) within numerical aperture $NA_2$ ($NA_2 < NA_1$), wherein the objective optical system includes the first lens group and the second lens group which are arranged successively in this order from the longer conjugate distance side of the objective optical system, and the first lens group has a phase structure, wherein the following expressions are satisfied when $W_{L1\lambda1}$ represents the wavefront aberration of the first lens group in the case when a parallel light flux having the diameter $\phi_1$ and the first wavelength $\lambda_1$ enters into the first lens group, $W_{L2\lambda1}$ represents a wavefront aberration of the second lens group for a parallel light flux having the diameter $\phi_1$ and the first wavelength $\lambda_1$ within the numerical aperture $NA_1$, M represents a magnification of the second lens group when $W_{L2\lambda1}$ is the minimum value, $W_{L2\lambda2}$ represents the wavefront aberration of the second lens group whose magnification is M for a light flux with the second wavelength $\lambda_2$ within the numerical aperture $NA_2$, and $W_{OBJ\lambda2}$ represents the wavefront aberration of the objective optical system within the numerical aperture $NA_2$ in the case when a parallel light flux having the diameter $\phi_2$ and the second wavelength $\lambda_2$ enters into the objective optical system;

$$W_{L1\lambda1} \leq 0.05 \lambda RMS \ (\lambda=\lambda_1) \quad (1)$$

$$W_{L2\lambda1} \leq 0.05 \lambda RMS \ (\lambda=\lambda_1) \quad (2)$$

$$-0.03 \leq M \leq 0.013 \quad (3)$$

$$W_{L2\lambda2} > 0.30 \lambda RMS \ (\lambda=\lambda_2) \quad (4)$$

$$W_{OBJ\lambda2} \leq 0.05 \lambda RMS \ (\lambda=\lambda_2) \quad (6)$$

wherein each of $W_{L2\lambda1}$, $W_{L2\lambda2}$ and $W_{OBJ\lambda2}$ represents the wavefront aberration whose defocus component is removed, the $W_{L2\lambda1}$ is measured with the protective layer having a thickness $t_1$ included, and each of $W_{L2\lambda2}$ and $W_{OBJ\lambda2}$ is measured with the protective layer having a thickness $t_2$ included.

The structure described in Item 2 is the objective optical system for an optical pickup apparatus described in Item 1, which satisfies the following expression (5)

$$W_{OBJ\lambda1} \leq 0.05 \lambda RMS \ (\lambda=\lambda_1) \quad (5)$$

where $W_{OBJ\lambda1}$ represents the wavefront aberration of the objective optical system within the numerical aperture $NA_1$ in the case when a parallel light flux having the light flux diameter $\phi_1$ and the first wavelength $\lambda_1$ enters into the objective optical system, wherein the $W_{OBJ\lambda1}$ represents the wavefront aberration from which a defocus component is removed, and $W_{OBJ\lambda1}$ is measured with the protective layer having a thickness $t_1$ included.

The structures as in the description in Items 1 and 2 controls wavefront aberration $W_{L1\lambda1}$ generated when a parallel light flux having light flux diameter $\phi_1$ and first wavelength $\lambda_1$ enters only the first lens group to be 0.05 $\lambda$RMS or less, namely to be almost zero, and further controls wavefront aberration $W_{L2\lambda1}$ generated when a parallel light flux having light flux diameter $\phi_1$ and first wavelength $\lambda_1$ enters only the second lens group to be 0.05 λRMS or less, namely to be almost zero, under the condition before the first lens group and the second lens group are combined. Therefore, in the structures as in the description in Items 1 and 2, the wavefront aberration $W_{OBJ\lambda1}$ within numerical aperture $NA_1$ in the case when a parallel light flux having light flux diameter $\phi_1$ and first wavelength $\lambda_1$ enters the objective optical system OBJ, under the condition that the objective optical system OBJ is formed by combining the first lens group and the second lens group is controlled to be 0.05 λ RMS, namely, to be almost zero.

On the other hand, a magnification of the second lens group in the case when the wavefront aberration is minimum value $W_{L2\lambda1}$ is made to be M, and wavelength aberration $W_{L2\lambda2}$ of the second lens group within numerical aperture $NA_2$ in the case when the light flux with wavelength $\lambda_2$ enters only the second lens group under the magnification M becomes greater to be 0.30 λRMS or more. This aberration is caused by a difference of a protective layer thickness between the first optical disk and the second optical disk, and by correcting this aberration with a phase structure provided on the first lens group, wavefront aberration $W_{OBJ\lambda2}$ within numerical aperture $NA_2$ in the case when a parallel light flux having light flux diameter $\phi_2$ and second wavelength $\lambda_2$ enters objective optical system OBJ can be controlled to 0.05 λRMS, namely, to substantially zero.

In general, aberration of the optical element grows greater in inverse proportion to the working wavelength. Therefore, it is more difficult to obtain performance characteristics of the optical element when the wavelength us shorter. As in the objective optical element of the invention, by designing the first lens group and the second lens group so that aberration of each of them may be zero substantially for the first wavelength $\lambda_1$ which is a shorter wavelength among the working wavelengths (namely, by designing so that expressions (1)-(3) may be satisfied), performance characteristics of each lens group for the first wavelength $\lambda_1$ can be obtained efficiently.

Further, in the structure of the objective optical system of the invention, spherical aberration caused by a difference of a protective layer thickness between the first optical disk and the second optical disk is corrected by a phase structure of the first lens group, and therefore, spherical aberration that cancels the aforementioned spherical aberration is added to the light flux with second wavelength $\lambda_2$ that has passed through the first lens group. Accordingly, when the second lens group is decentered from the first lens group, aberration caused for the second wavelength $\lambda_2$ grows greater extremely.

In the objective optical system relating to the invention, performance characteristics of each lens group for the first wavelength $\lambda_1$ are obtained. Therefore, when the second lens group is decentered from the first lens group, aberration caused for the first wavelength $\lambda_1$ is extremely small, thus, aberration for the first wavelength $\lambda_1$ does not need to be confirmed in the course of assembling, and expression (5) representing aberration for the first wavelength $\lambda_1$ as the objective optical system can easily be satisfied. Accordingly, only aberration (coma, in particular) for the second wavelength $\lambda_2$ has to be confirmed in the course of assembling, and characteristics of the objective optical system for the second wavelength $\lambda_2$ can easily be obtained by assembling to satisfy expression (6).

Thus, the invention makes it possible to manufacture, efficiently and at low cost, compatible objective optical systems having excellent performances for all working wavelengths.

A phase structure formed on the first lens group is used to correct spherical aberration caused mainly by a difference of protective layer thickness between the first optical disk and the second optical disk. However, it may further be made to be one that corrects also chromatic aberration caused by a wavelength difference between the first wavelength $\lambda_1$ and the second wavelength $\lambda_2$. Incidentally, the chromatic aberration mentioned here means a difference of paraxial image point positions (axial chromatic aberration) caused by a wavelength difference and/or spherical aberration caused by a wavelength difference.

Figure 2:
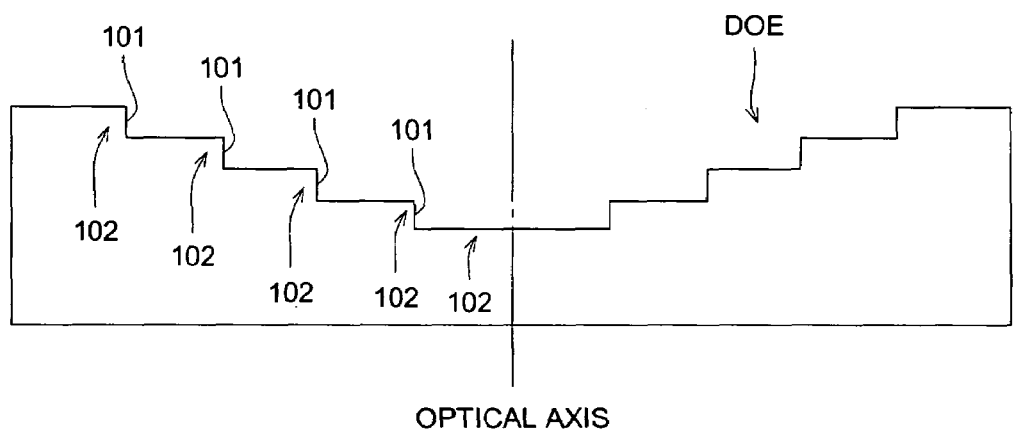
FIG. 2(b) is a side view showing an example of a diffractive structure.
Figure 2:
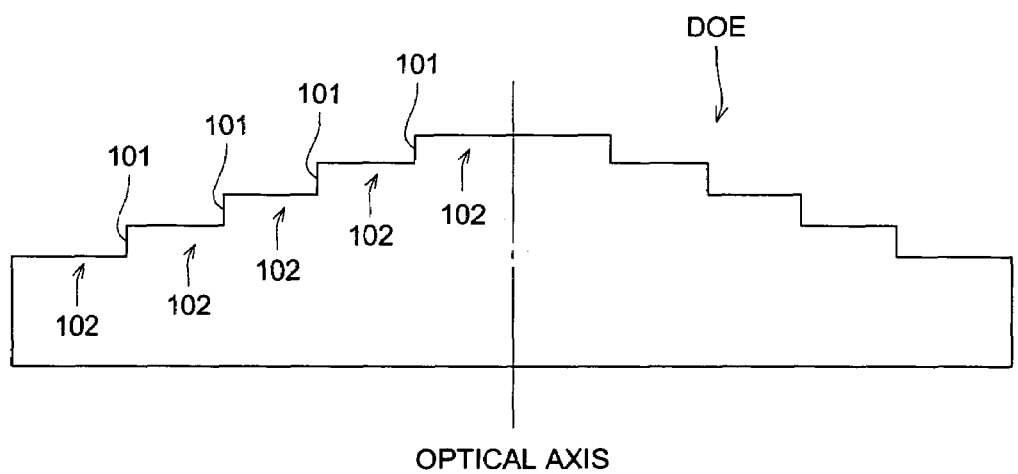
Figure 3:
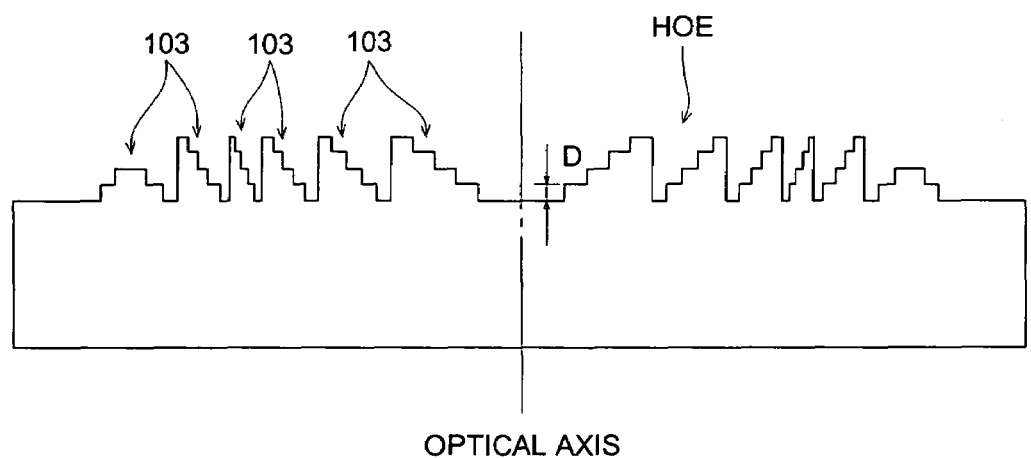
FIG. 3(b) is a side view showing an example of a diffractive structure.
Figure 3:
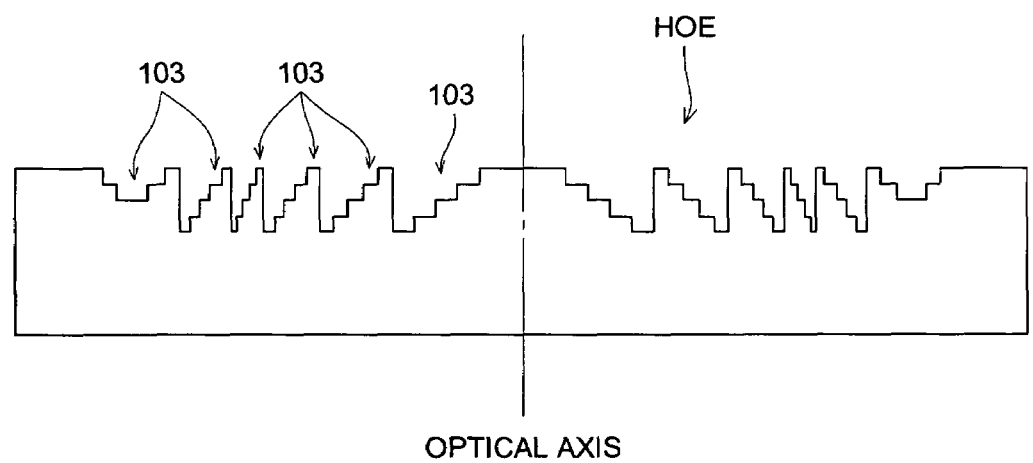

The phase structure mentioned above may either of a diffractive structure and an optical path difference providing structure. The diffractive structure includes a structure including plural ring-shaped zones 100 wherein a sectional view including an optical axis is in a form of serration, as shown schematically in FIG. 1, a structure including plural ring-shaped zones 102 in which all of the directions of level difference 101 are the same within an effective diameter wherein a sectional view including an optical axis is in a form of stairs, as shown schematically in FIG. 2(*a*) and FIG. 2(*b*), a structure including plural ring-shaped zones 105 in which a direction of level difference 104 is switched on the halfway of an effective diameter wherein a sectional view including an optical axis is in a form of stairs, as shown schematically in FIGS. 4(*a*) and 4(*b*), and a structure including plural ring-shaped zones 103 in which a stair-structure is formed inside, as shown schematically in FIG. 3(*a*) and FIG. 3(*b*).

Figure 4:
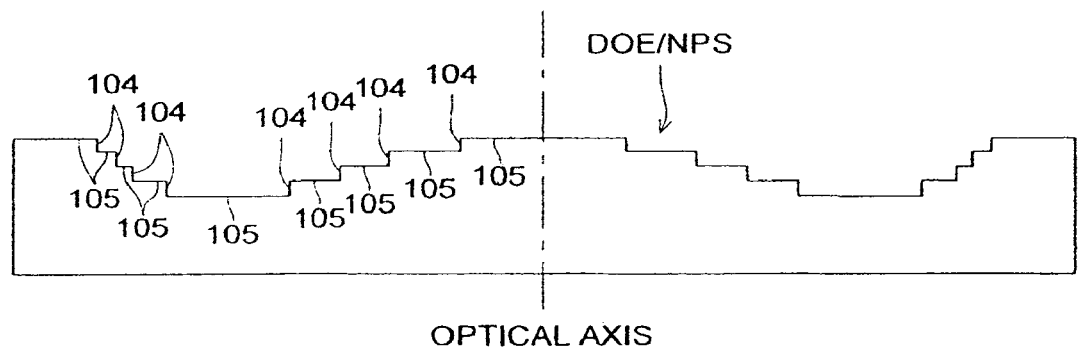
FIG. 4(b) is a side view showing an example of a diffractive structure.
Figure 4:
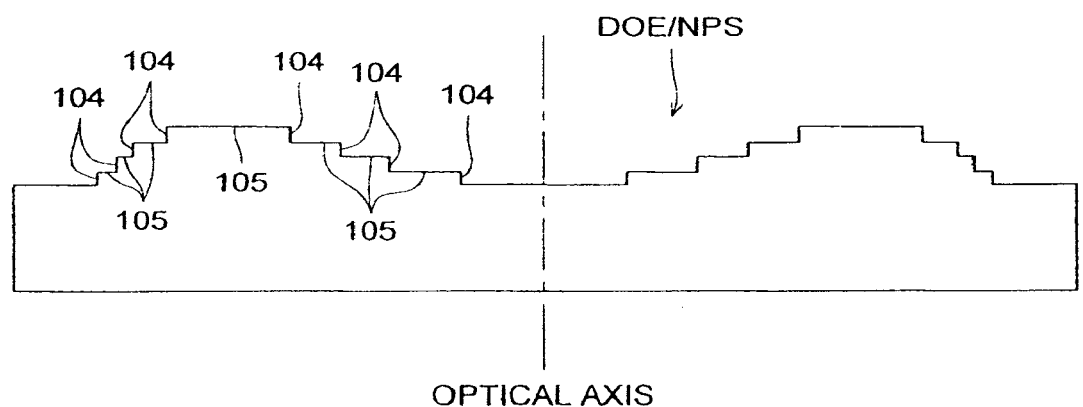

Further, the optical path difference proving structure includes a structure including plural ring-shaped zones 105 in which a direction of level difference 104 is switched on the halfway of an effective diameter wherein a sectional view including an optical axis is in a form of stairs, as shown schematically in FIG. 4(*a*) and FIG. 4(*b*). Incidentally, though each of FIG. 1(*a*)-FIG. 4(*b*) shows schematically an occasion wherein each phase structure is formed on a plane surface, each phase structure may also be formed on a spherical surface or on an aspheric surface. Further, there is an occasion where the structure is one shown in FIG. 4(*a*) and FIG. 4(*b*) in all cases of the diffractive structure and the optical path difference providing structure.

Further, in the present specification, let it be assumed that "objective optical system" means a lens group composed of a light converging element that is arranged at the position to face an optical disk in an optical pickup apparatus and has a function to converge respectively light fluxes each being emitted from a light source and having a different wavelength on information recording surfaces of optical disks each having different recording density and an optical element that is united solidly with the light converging element to be driven by an actuator for tracking and focusing.

Further, the numerical aperture in the present specification means the numerical aperture stipulated in the standard of optical disks, or an image-side numerical aperture of an objective optical system having diffraction limit power capable of obtaining a spot diameter that is necessary for conducting recording and/or reproducing of information for an optical disk.

The structure described in Item 3 is the objective optical system for an optical pickup apparatus described in Item 1 or 2, wherein the following expression (7) is satisfied by the ratio of a paraxial power $P_{L1}$ of the first lens group for the light flux with the first wavelength $\lambda_1$ to a paraxial power $P_{L2}$ of the second lens group for the light flux with the first wavelength $\lambda_1$.

$$|P_{L1}/P_{L2}| \leq 0.2 \qquad (7)$$

By causing the second lens group arranged exclusively to be on the optical disk side to have a refracting power for the incident light flux having wavelength $\lambda_1$ as described in Item 3, it is possible to secure a working distance for the second optical disk sufficiently. Further, when a diffractive structure having steps in the optical axis direction is formed on the first lens group as a phase structure, a rate of a light flux which does not contribute to formation of a light converging spot with its way through blocked by the steps can be controlled, and a decline of transmittance can be prevented.

The structure described in Item 4 is the objective optical system for an optical pickup apparatus described in Item 3, wherein the following expressions (8) and (9) are satisfied by a coma amount. $W_{C1}$ of the objective optical system within the numerical aperture $NA_1$ for the parallel light flux with the first wavelength $\lambda_1$ which is measured with the first lens group, the second lens group and the protective layer with a thickness $t_1$ arranged along one optical axis, a coma amount $W_{C2}$ of the objective optical system within the numerical aperture $NA_1$ for the parallel light flux with the first wavelength $\lambda_1$ which is measured with the second lens group and the protective layer with a thickness $t_1$ arranged along one optical axis and with an optical axis of the first lens group shifted 10 µm to an optical axis of the second lens group, a coma amount $W_{C3}$ of the objective optical system within the numerical aperture $NA_2$ for the parallel light flux with the second wavelength $\lambda_2$ which is measured with the first lens group, the second lens group and the protective layer with a thickness $t_2$ arranged along one optical axis, a coma amount $W_{C4}$ of the objective optical system within the numerical aperture $NA_2$ for the parallel light flux with the second wavelength $\lambda_2$ which is measured with the second lens group and the protective layer with a thickness $t_2$ arranged along one optical axis and with an optical axis of the first lens group shifted 10 µm to an optical axis of the second lens group, $W_{S1}$ is a difference between $W_{C1}$ and $W_{C2}$, and $W_{S2}$ is a difference between $W_{C3}$ and $W_{C4}$.

$$W_{S1}=W_{C2}-W_{C1}<0.01 \lambda RMS. (\lambda=\lambda_1) \qquad (8)$$

$$W_{S2}=W_{C4}-W_{C3}>0.02 \lambda RMS (\lambda=\lambda_2) \qquad (9)$$

Herein each of the $W_{S1}$ and $W_{S2}$ represents wavefront aberration from which defocus components are eliminated, and the $W_{S1}$ is to be measured including the thickness $t_1$, while, the WS2 is to be measured including the thickness $t_2$.

In the objective optical system of the invention, comatic aberration caused for the first wavelength $\lambda_1$ by shifting between lens groups is small, because performance characteristics of each lens group are obtained for the first wavelength $\lambda_1$ as stated above. On the other hand, comatic aberration caused for the second wavelength $\lambda_2$ by shifting between lens groups is large, because of the structure wherein spherical aberration caused by a difference between protective layer thicknesses is corrected by the phase structure. Therefore, if the expressions (8) and (9) are satisfied as described in Item 3, it is possible to judge that each lens group was manufactured to satisfy each of expressions (1)-(3).

The structure described in Item 5 is the objective optical system for an optical pickup apparatus described in Item 3 or Item 4, the following expressions (10) and (11) are satisfied by a coma amount $W_{C1}$ of the objective optical system within the numerical aperture $NA_1$ for the parallel light flux with the first wavelength $\lambda_1$ which is measured with the first lens group, the second lens group and the protective layer with a thickness $t_1$ arranged along one optical axis, a coma amount $W_{C5}$ of the objective optical system within the numerical aperture $NA_1$ for the parallel light flux with the first wavelength $\lambda_1$ which is measured with the second lens group and the protective layer with a thickness $t_1$ arranged along one optical axis arranged and with an optical axis of the first lens group tilted 5 minutes to an optical axis of the second lens group, where a coma amount $W_{C3}$ of the objective optical system within the numerical-aperture $NA_2$ for the parallel light flux with the second wavelength $\lambda_2$ which is measured with the first lens group, the second lens group and the protective layer with a thickness $t_2$ arranged along one optical axis, a coma amount $W_{C6}$ of the objective optical system within the numerical aperture $NA_2$ for the parallel light flux with the second wavelength $\lambda_2$ which is measured with the second lens group and the protective layer with a thickness $t_2$ arranged along one optical axis and with an optical axis of the first lens group tilted 5 minutes to an optical axis of the second lens group, $W_{T1}$ is a difference between $W_{C5}$ and $W_{C1}$, and $W_{T2}$ is a difference between $W_{C6}$ and $W_{C3}$.

$$W_{T1}=W_{C5}-W_{C1}<0.02 \lambda RMS (\lambda=\lambda_1) \qquad (10)$$

$$W_{T2}=W_{C6}-W_{C3}>0.02 \lambda RMS (\lambda=\lambda_1) \qquad (11)$$

Herein each of the $W_{T1}$ and $W_{T2}$ represents wavefront aberration from which defocus components are removed, and the $W_{T1}$ is to be measured including the thickness $t_1$, while, the $W_{T2}$ is to be measured including the thickness $t_2$.

As described in Item 5, the objective optical system of the invention has a structure to make the second lens group on the optical disk side to shoulder the most of paraxial power for securing sufficient working distance for the second optical disk with a thick protective layer, and therefore, the paraxial power of the first lens group is small. Accordingly, comatic aberration caused by tilting between lens groups is small for any wavelength. If expressions (10) and (11) are satisfied, therefore, each lens group can be judged to be manufactured to satisfy expressions (1)-(3).

Further, in a two-group-structured compatible objective optical system, there are caused aberrations which result from at least four types of decentering errors in the course of assembling. Namely, the aberration is one caused by shifting between lens groups which are respectively for first wavelength $\lambda_1$ and second wavelength $\lambda_2$, and one caused by tilting between lens groups which are respectively for first wavelength $\lambda_1$ and second wavelength $\lambda_2$ It lowers manufacturing efficiency conspicuously to assemble by confirming these four types of decentering aberrations, which leads to an increase of manufacturing cost, and causes a fear to preclude mass production.

In the case of the objective optical system of the invention, it has only to confirm aberration caused by shifting between lens groups for second wavelength $\lambda_2$ alone among four types of decentering aberrations, when expressions (8)-(11) are satisfied, which makes it possible to manufacture two-group-structured compatible objective optical systems having sufficient performances for plural working wavelengths, at high efficiency and at low cost.

The structure described in Item 6 is the objective optical system for an optical pickup apparatus described in any one of Item 1-Item 5, wherein a positioning mark for aligning optical axes is formed on each of the first lens group and the second lens group, and the first lens group and the second lens group are positioned each other by help of the positioning mark.

As described in Item 6, the first lens group and the second lens group can easily be fixed under the condition that optical axes thereof are aligned, by forming a positioning mark for aligning optical axes on each of the first lens group and the second lens group.

The structure described in Item 7 is the objective optical system for an optical pickup apparatus described in any one of Item 1-Item 6, wherein the phase structure corrects spherical aberration which is caused in the second lens group due to a difference between a protective layer thickness $t_1$ of the first optical disk and a protective layer thickness $t_2$ of the second optical disk.

The structure described in Item 8 is the objective optical system for an optical pickup apparatus described in any one of Item 1-Item 7, wherein the phase structure is a diffractive structure or an optical path difference providing structure.

The structure described in Item 9 is the objective optical system for an optical pickup apparatus described in any one of Item 1-Item 8, wherein the following expressions (12)-(17) are satisfied by the first wavelength $\lambda_1$, the second wavelength $\lambda_2$, protective layer thickness $t_1$ of the first optical disk, protective layer thickness $t_2$ of the second optical disk, the numerical aperture $NA_1$ and the numerical aperture $NA_2$.

$$350 \text{ nm} < \lambda_1 < 420 \text{ nm} \tag{12}$$

$$630 \text{ nm} < \lambda_2 < 680 \text{ nm} \tag{13}$$

$$0 \text{ mm} \leq t_1 \leq 0.2 \text{ mm} \tag{14}$$

$$0.55 \text{ mm} \leq t_2 \leq 0.65 \text{ mm} \tag{15}$$

$$0.8 < NA_1 < 0.9 \tag{16}$$

$$0.55 < NA_2 < 0.7 \tag{17}$$

The structure described in Item 10 is an optical pickup apparatus including a first light source for emitting a first parallel light flux with a first wavelength $\lambda_1$ and a diameter $\phi_1$; a second light source for emitting a second parallel light flux with a second wavelength $\lambda_2$ ($\lambda_2 > \lambda_1$) and a diameter $\phi_2$ ($\phi_2 < \phi_1$); and an objective optical system of any one of Items 1-9 for converging the first parallel light flux on an information recording surface of a first optical disk having a protective layer with a thickness $t_1$ within a numerical aperture $NA_1$, and for converging the second parallel light flux on an information recording surface of a second optical disk having a protective layer with a thickness $t_2$ ($t_2 > t_1$) within a numerical aperture $NA_2$ ($NA_2 < NA_1$).

The structure described in Item 11 is provided with the optical pickup apparatus described in Item 10.

The invention makes it possible to provide an efficient two-group-structured objective optical system having a phase structure and being capable of conducting properly recording and/or reproducing of information for plural optical disks each having different recording density which can be manufactured efficiently and at low cost, an optical pickup apparatus equipped with the aforesaid objective optical system and an optical information recording and reproducing apparatus.

The preferred embodiment for practice the invention will be explained as follows, referring to the drawings.

Figure 5:
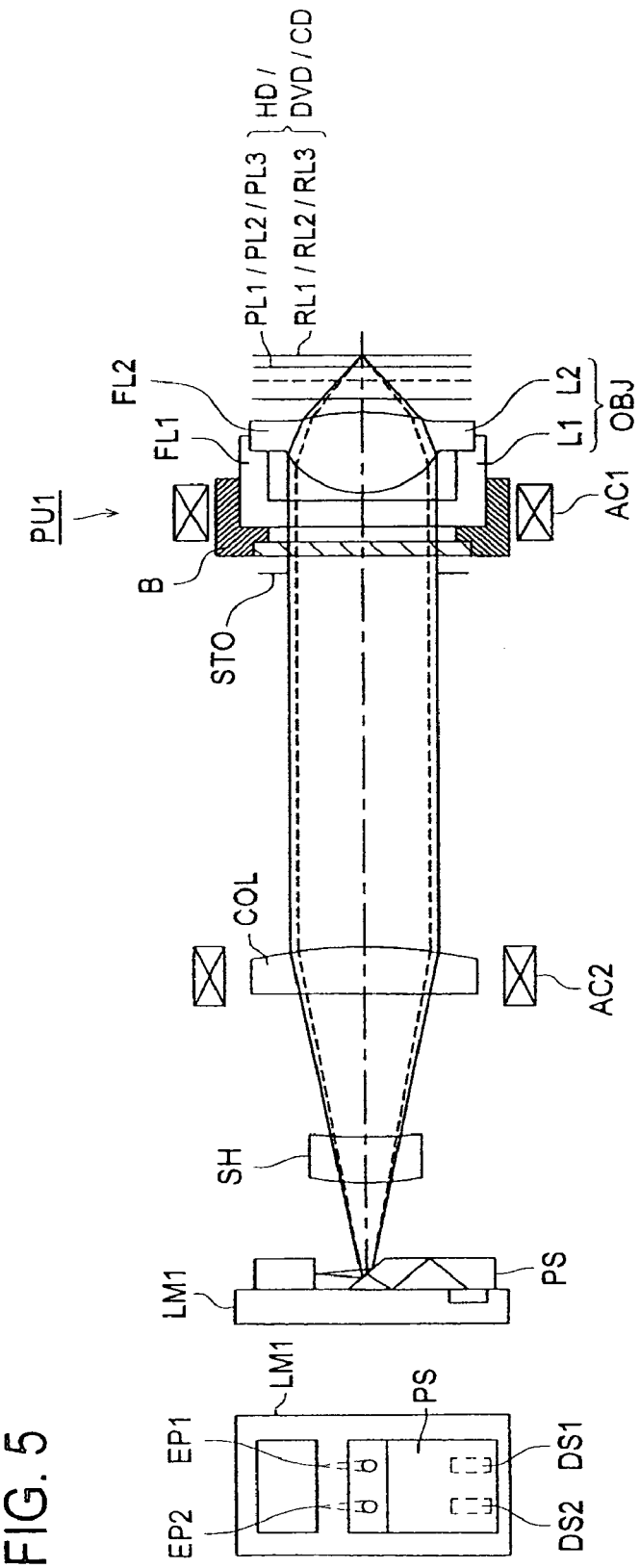
FIG. 5 is a plan view of primary portions showing the structure of an optical pickup apparatus.

FIG. 5 is a diagram showing schematically the structure of optical pickup apparatus PU1 capable of conducting recording and reproducing of information properly with a simple structure for any of high density optical disc HD (first optical disk) and DVD (second optical disk). Optical specifications of the high density optical disc HD include first wavelength $\lambda_1 = 408$ nm, first protective layer PL1 thickness $t_1 = 0.0875$ mm, and numerical aperture $NA_1 = 0.85$, while, optical specifications of DVD include second wavelength $\lambda_2 = 658$ nm, second protective layer PL2 thickness $t_2 = 0.6$ mm, and numerical aperture $NA_2 = 0.60$.

Recording densities ($\rho_1$ and $\rho_2$) of the first optical disk and the second optical disk satisfy $\rho_2 < \rho_1$, and magnifications (first magnification $M_1$ and second magnification $M_2$) of objective optical system OBJ in the case of conducting recording and/or reproducing of information for the first optical disk and the second optical disk satisfy $M_1 = M_2 = 0$, provided that the combination of the wavelength, the protective layer thickness, the numerical aperture, the recording density and the magnification is not limited to the foregoing.

Optical pickup apparatus PU1 is composed of laser module LM1 for high density optical disc HD and DVD having therein first luminous point EP1 (first light source) emitting a laser light flux (first light flux) that is emitted when conducting recording and reproducing of information for high density optical disc HD and has wavelength 408 nm, second luminous point EP2 (second light source) emitting a laser light flux (second light flux) that is emitted when conducting recording and reproducing of information for DVD and has wavelength 658 nm, first light-receiving section DS1 that receives reflected light flux coming from information recording surface RL1 of high density optical disc HD, second light-receiving section DS2 that receives reflected light flux coming from information recording surface RL2 of DVD, and prism PS, objective optical system OBJ wherein aberration correcting element L1 (first lens group) on which a diffractive structure serving as a phase structure is formed on its optical surface and light converging element L2 (second lens group) provided on its both sides with aspheric surfaces having a function to converge a laser light flux having been transmitted through the aberration correcting element L1 on information recording surfaces RL1 and RL2, aperture regulating element AP, biaxial actuator AC1, uniaxial actuator AC2, diaphragm STO corresponding to numerical aperture NA1 of high density optical disc HD, collimator lens COL (movable element) and beam shaping element SH.

When conducting recording and reproducing of information for high density optical disc, in the optical pickup apparatus PU1, laser module LM1 for high density optical disc HD and DVD is operated to make the first luminous point EP1 to emit light. A divergent light flux emitted from the first luminous point EP1 is reflected by prism PS, then, is transmitted through beam shaping element SH so that its sectional form may be changed from an oval form to a circular form, then, it passes through collimator lens COL to be converted into a parallel light flux, then, it is transmitted through polarizing beam splitter BS and its light flux diameter is regulated to $\phi_1$ by diaphragm STO, then, is transmitted through aperture regulating element AP to become a spot which is formed by objective optical system OBJ on information recording surface RL1 through the first protective layer PL1, as its light path is drawn with solid lines in FIG. 5. The objective optical system OBJ conducts focusing and tracking with a help of biaxial actuator AC1 arranged around the objective optical system OBJ. The reflected light flux modulated by information pits on the information recording surface RL1 is transmitted again through the objective optical system OBJ, the aperture regulating element AP and the polarizing beam splitter BS, to be converted into a converged light flux by the collimator lens COL, and is reflected twice in the prism PS after being transmitted through the beam shaping element SH, to be converged on light-receiving portion DS1. Thus, information recorded on high density optical disc HD can be read by the use of signals outputted from the light-receiving portion DS1.

Further, when conducting recording and reproducing of information for DVD in the optical pickup apparatus PU1, the collimator lens COL is moved by uniaxial actuator AC2 so that a distance from objective optical system OBJ to the collimator lens COL may be smaller than that in the case of conducting recording and reproducing of information for high density optical disc HD, for the purpose that a second light flux emerges from the collimator lens COL under the condition of its parallel light flux. After that, the objective optical system OBJ and first laser module for high density optical disc HD and DVD LM1 are operated to make second luminous point EP2 to emit light. A divergent light flux emitted from the second luminous point EP2 is reflected by prism PS and is transmitted through the beam shaping element SH so that its sectional form may be changed from an oval form to a circular form, then, it passes through collimator lens COL to be converted into a parallel light flux, then, it is transmitted through polarizing beam splitter BS and its light flux diameter is regulated to $\phi_2$ ($\phi_2 < \phi_1$) when it is transmitted through aperture regulating element AP to become a spot which is formed by objective optical system OBJ on information recording surface RL2 through the second protective layer PL2, as its light path is drawn with dotted lines in FIG. 5. The objective optical system OBJ conducts focusing and tracking with a help of biaxial actuator AC1 arranged around the objective optical system OBJ. The reflected light flux modulated by information pits on the information recording surface RL2 is transmitted again through the objective optical system OBJ, the aperture regulating element AP and the polarizing beam splitter. BS, to be converted into a converged light flux by the collimator lens COL, and is reflected twice in the prism PS after being transmitted through the beam shaping element SH, to be converged on light-receiving portion DS2. Thus, information recorded on DVD can be read by the use of signals outputted from the light-receiving portion DS2.

Next, the structure of the objective optical system OBJ will be explained. Aberration correcting element L1 is a plastic lens whose refractive index nd at d line is 1.5091 and Abbe's number υd is 56.5, while, its refractive index for $\lambda_1$ is 1.5242 and that for $\lambda_2$ is 1.5064. Further, light converging element L2 is a plastic lens whose refractive index nd at d line is 1.5435 and Abbe's number υd is 56.3. Around respective optical functional portions (area of aberration correcting element L1 and light converging element L2 through which the first light flux passes), there are provided flange portions FL1 and FL2 formed to be solid with the optical functional portion, and the optical functional portions are united integrally when a part of the flange portion FL1 and a part of the flange portion FL2 are connected together.

Incidentally, when uniting the aberration correcting element L1 and the light converging element L2, it is also possible to unite them through an optical frame representing a separate member.

When $W_{L1\lambda1}$ represents the wavefront aberration of aberration correcting element L1 in the case when a parallel light flux-having the diameter $\phi_1$ and the first wavelength $\lambda_1$ enters into the aberration correcting element L1, $W_{L2\lambda1}$ represents a wavefront-aberration of light converging element L2 for a parallel light flux having the diameter $\phi_1$ and the first wavelength $\lambda_1$ within the numerical aperture $NA_1$, M represents a magnification of light converging element L2 when $W_{L2\lambda1}$ is the minimum value, $W_{L2\lambda2}$ represents the wavefront aberration of light converging element L2 whose magnification is M for a light flux with the second wavelength $\lambda_2$ within the numerical aperture $NA_2$, $W_{OBJ\lambda1}$ is a wavefront aberration of the objective optical system OBJ within the numerical aperture $NA_1$ when the parallel light flux with the first wavelength $\lambda_1$ enters into the objective optical system OBJ and $W_{OBJ\lambda2}$ represents the wavefront aberration of the objective optical system OBJ within the numerical aperture $NA_2$ in the case when a parallel light flux having the diameter $\phi_2$ and the second wavelength $\lambda_2$ enters into the objective optical system OBJ, lenses are designed so that the following expressions (1)-(6) are satisfied;

$$W_{L1\lambda1} \leq 0.05\ \lambda RMS\ (\lambda = \lambda_1) \quad (1)$$

$$W_{L2\lambda1} \leq 0.05\ \lambda RMS\ (\lambda = \lambda_1) \quad (2)$$

$$-0.03 \leq M \leq 0.13 \quad (3)$$

$$W_{L2\lambda2} > 0.30\ \lambda RMS\ (\lambda = \lambda_2) \quad (4)$$

$$W_{OBJ\lambda1} \leq 0.05\ \lambda RMS\ (\lambda = \lambda_1) \quad (5)$$

$$W_{OBJ\lambda2} \leq 0.05\ \lambda RMS\ (\lambda = \lambda_2) \quad (6)$$

wherein, the $W_{L2\lambda1}$, $W_{OBJ\lambda1}$, $W_{L2\lambda2}$ and $W_{OBJ\lambda2}$ represent the wavefront aberration from which a defocus component is removed, the $W_{L2\lambda1}$ and $W_{OBJ\lambda1}$ are to be measured including the protective layer with a thickness $t_1$, and the $W_{L2\lambda2}$ and $W_{OBJ\lambda2}$ are to be measured including the protective layer with a thickness $t_2$.

Specifically, the structure controls wavefront aberration $W_{L1\lambda1}$ generated when a parallel light flux representing the first light flux having light flux diameter $\phi_1$ enters only the aberration correcting element L1 under the condition before the aberration correcting element L1 and the light converging element L2 are combined, and controls wavefront aberration $W_{L2\lambda1}$ generated when a parallel light flux representing the first light flux having light flux diameter $\phi_1$ enters only the light converging element L2 to be 0.05 $\lambda$RMS or less, namely to be almost zero. Therefore, in the structure, the wavefront aberration $W_{OBJ\lambda1}$ within numerical aperture $NA_1$ in the case when a parallel light flux representing the first light flux having light flux diameter $\phi_1$ enters the objective optical system OBJ is controlled to 0.05 $\lambda$RMS, namely, to be almost zero, by controlling wavefront aberration $W_{L1\lambda1}$ generated when a parallel light flux representing the first light flux having light flux diameter $\phi_1$ enters only the aberration correcting element L1 under the condition before the aberration correcting element L1 and the light converging element L2 are combined, and by controlling wavefront aberration $W_{L2\lambda1}$ generated when a parallel light flux representing the first light flux having light flux diameter $\phi_1$ enters only the light converging element L2 to be 0.05 $\lambda$RMS or less, namely to be almost zero.

On the other hand, a magnification of the light converging element L2 in the case when the wavefront aberration is minimum value $W_{L2\lambda1}$ is made to be M, and wavelength aberration $W_{L2\lambda2}$ of the light converging element L2 within numerical aperture $NA_2$ in the case when the second light flux enters only the light converging element L2 under the condition of the magnification M is 0.03 $\lambda$RMS or more. This aberration is caused by a difference of a protective layer thickness between high density optical disc HD and DVD (first protective layer PL1 thickness $t_1$=0.0875 mm, second protective layer PL2 thickness $t_2$=0.6 mm), and a diffractive structure serving as a phase structure is provided on aberration correcting element L1 to correct the aforesaid aberration and to control wavefront aberration $W_{OBJ\lambda2}$ within numerical aperture $NA_2$ in the case when a parallel light flux representing the second light flux having light flux diameter $\phi2$ enters the objective optical system OBJ to 0.05 $\lambda$RMS, namely, to almost zero.

Specifically, optical surface S1 of the aberration correcting element L1 on the semiconductor laser light source side is divided into first area AREA1 corresponding to an area within $NA_2$ and second area AREA2 corresponding to an area from $NA_2$ to $NA_1$, and in the first area AREA1, there is formed a diffractive structure wherein plural ring-shaped zones each having its center on an optical axis in which a stair-structure is formed inside are formed as shown in FIGS. 3(a) and 3(b) (hereinafter, this diffractive structure is called "diffractive structure HOE").

In diffractive structure HOE formed in the first area AREA1, depth D of the stair-structure formed in each ring-shaped zone is set to the value calculated by the following expression, $$D \cdot (N_{\lambda 1} - 1)/\lambda_1 = 2 \cdot q$$

and the number of division P in each ring-shaped zone is set to 5. In the expression above, $\lambda_1$ represents one wherein a wavelength of the laser light flux emitted from luminous point EP1 is expressed by a unit of micron ($\lambda_1 = 0.408$ μm, here), $N_{\lambda 1}$ represents a refractive index for the first wavelength $\lambda_1$ ($N_{\lambda 1} = 1.5242$, here), and q represents a natural number.

When the first light flux with the first wavelength $\lambda_1$ enters the stair-structure wherein the depth D in the optical axis direction is set as stated above, an optical path difference of $2 \times \lambda_1$ (μm) is caused between adjoining stair-structures, and the first light flux is given no phase difference substantially, and is transmitted without being diffracted (which is called "0-order diffracted light", in the present specification).

On the other hand, when the second light flux with the second wavelength $\lambda_2$ ($\lambda_2 = 0.658$ μm, here) enters the stair-structure, an optical path difference of $2 \times 0.408 \times (1.5064-1)/(1.5242-1) - 0.658 = 0.13$ (μm) is caused between adjoining stair-structures. Since the number of division P in each ring-shaped zone is set to 5, an optical path difference equivalent to one wavelength of the second wavelength $\lambda_2$ is caused between adjoining ring-shaped zones ($0.13 \times 5 = 0.65 \sim 1 \times 0.658$), thus, the second light flux is diffracted in the +1 order direction (+1 order diffracted light). The diffraction efficiency of the +1 order diffracted light of the second light flux in this case is 87.5%, which means sufficient amount of light for conducting recording and reproducing of information for DVD. Incidentally, the value of the aforesaid 1.5064 represents the diffractive index of the aberration correcting element L1 for the second wavelength $\lambda_2$.

As stated above, the light converging element L2 is designed so that the wavefront aberration may be the smallest for the combination of the first wavelength $\lambda_1$, the magnification M and the first protective layer PL1, and a thickness difference between the first protective layer PL1 and the second protective layer PL2 makes the spherical aberration of the second light flux which has been transmitted through the light converging element L2 and the second protective layer PL2 to be in the direction of over correction.

Therefore, in the arrangement, a width of each ring-shaped zone of diffractive structure HOE is established so that spherical aberration in the direction of insufficient correction may be added to $+1^{st}$ order diffracted light by the diffracting action when the second light flux enters, and the second light flux which has been transmitted through the diffractive structure HOE and the second protective layer PL2 forms an excellent spot on information recording surface RL2 of DVD when an amount of addition of spherical aberration by the diffractive structure HOE and spherical aberration in the direction of over correction caused by a thickness difference between the first protective layer PL1 and the second protective layer PL2 offset each other.

Figures 6A, 6B, 6C:
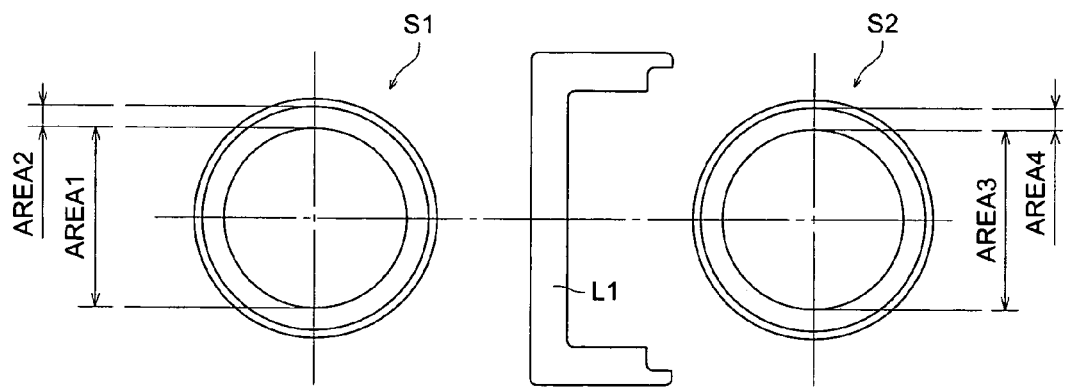
FIG. 6(a) is a front view.
FIG. 6(b) is a side view and FIG. 6(c) is a rear view all of an aberration correcting element.

Further, optical surface S2 of aberration correcting element L1 is divided into third area AREA3 including an optical axis corresponding to an area within $NA_2$ and fourth area AREA4 corresponding to an area from $NA_2$ to $NA_1$ as shown in FIGS. 6(a)-6(c), and diffractive structures (which are called "diffractive structures DOE1 and DOE2" hereafter) each being composed of plural ring-shaped zones whose sectional view including an optical axis shown in FIG. 2(a) is in a stair-form are formed respectively on the third area AREA3 and the fourth area AREA4.

The diffractive structures DOE1 and DOE2 are the structures respectively to control axial chromatic aberration of objective optical system OBJ in a violet area and to control spherical aberration changes resulting from changes in incident wavelength. These diffractive structures have wavelength-dependency of spherical aberration wherein spherical aberration changes in the direction of insufficient correction when a wavelength of incident light flux is longer and spherical aberration changes in the direction of over correction when a wavelength of incident light flux is shorter, both in a violet area. Owing to this, the tolerance for wavelength errors of first light source EP1 is broadened by canceling spherical aberration changes caused on the light converging element L2 by changes of incident wavelength.

In the diffractive structure DOE1, height d1 of the step that is closest to the optical axis is designed so that the diffraction efficiency may be 100% for wavelength 390 nm (the diffraction efficiency of the aberration correcting element L1 for wavelength 390 nm is 1.5273). In the case of the diffractive structures DOE1 wherein the depth of the step is established as stated above, when the first light flux enters that diffractive structure, $+2^{nd}$ order diffracted light is generated at the diffraction efficiency of 96.8%, when the second light flux enters that diffractive structure, $+1^{st}$ order diffracted light is generated at the diffraction efficiency of 93.9%, and when the third light flux enters that diffractive structure, $+1^{st}$ order diffracted light is generated at the diffraction efficiency of 99.2%. Thereby, sufficient diffraction efficiency can be obtained at any wavelength area, and correction of chromatic aberration in the wavelength area for the second light flux does not become excessive even when the chromatic aberration is corrected in the violet area.

On the other hand, the diffractive structure DOE2 is optimized for the first wavelength $\lambda_1$, and when the first light flux enters the diffractive structure DOE2, $+2^{nd}$ order diffracted light is generated at the diffraction efficiency of 100%.

In the objective optical system OBJ in the present embodiment, diffraction efficiency is distributed for the first light flux and the second light flux, by optimizing the diffractive structure DOE1 for the wavelength 390 nm. However, it is also possible to employ the structure wherein the diffraction efficiency for the first light flux is emphasized by optimizing for the first wavelength $\lambda_1$, even in the diffractive structure DOE1 equally to the diffractive structure DOE2.

When the objective optical system OBJ is made to be of a two-group structure with aberration correcting element L1 and light converging element L2, as stated above, if lens design is performed so that an amount of wavefront aberration of each of the aberration correcting element L1 and light converging element L2 may be within a range that satisfies the aforesaid expressions (1), (2) and (3), it is possible to obtain easily objective optical system OBJ wherein an amount of wavefront-aberration is within ranges of expressions (5) and (6), namely, an amount of wavefront aberration is substantially zero.

When a coma amount $W_{c1}$ of the objective optical system OBJ within the numerical aperture $NA_1$ for the parallel light flux with the first wavelength $\lambda_1$ which is measured with aberration correcting element L1, light converging element L2 and the protective layer with a thickness $t_1$ arranged along one optical axis, a coma amount $W_{C2}$ of the objective optical system OBJ within the numerical aperture $NA_1$ for the parallel light flux with the first wavelength $\lambda_1$ which is measured with light converging element L2 and the protective layer with a thickness $t_1$ arranged along one optical axis and with an optical axis of the aberration correcting element L1 shifted 10 μm to an optical axis of light converging element L2, a coma amount $W_{C3}$ of the objective optical system OBJ within the numerical aperture $NA_2$ for the parallel light flux with the second wavelength $\lambda_2$ which is measured with aberration correcting element L1, light converging element L2 and the protective layer with a thickness $t_2$ arranged along one optical axis, a coma amount $W_{C4}$ of the objective optical system OBJ within the numerical aperture $NA_2$ for the parallel light flux with the second wavelength $\lambda_2$ which is measured with light converging element L2 and the protective layer with a thickness $t_2$ arranged along one optical axis and with an optical axis of aberration correcting element L1 shifted 10 μm to an optical axis of light converging element L2, $W_{S1}$ is a difference between $W_{C1}$ and $W_{C2}$, and $W_{S2}$ is a difference between $W_{C3}$ and $W_{C4}$;

$$W_{S1} = W_{C2} - W_{C1} < 0.01 \; \lambda RMS \; (\lambda = \lambda_1) \quad (8)$$

$$W_{S2} = W_{C4} - W_{C3} > 0.02 \; \lambda RMS \; (\lambda = \lambda_2) \quad (9)$$

Herein each of the $W_{S1}$ and $W_{S2}$ represents wavefront aberration from which defocus components are removed, and the $W_{S1}$ is to be measured including the thickness $t_1$, while, the WS2 is to be measured including the thickness $t_2$.

Further, when a coma amount $W_{C1}$ of the objective optical system within the numerical aperture $NA_1$ for the parallel light flux with the first wavelength $\lambda_1$ which is measured with the first lens group, the second lens group and the protective layer with a thickness $t_1$ arranged along one optical axis, a coma amount $W_{C5}$ of the objective optical system within the numerical aperture $NA_1$ for the parallel light flux with the first wavelength $\lambda_1$ which is measured with the second lens group and the protective layer with a thickness $t_1$ arranged along one optical axis and with an optical axis of the first lens group tilted 5 minutes to an optical axis of the second lens group, where a coma amount $W_{C3}$ of the objective optical system within the numerical aperture $NA_2$ for the parallel light flux with the second wavelength $\lambda_2$ which is measured with the first lens group, the second lens group and the protective layer with a thickness $t_2$ arranged along one optical axis, a coma amount $W_{C6}$ of the objective optical system within the numerical aperture $NA_2$ for the parallel light flux with the second wavelength $\lambda_2$ which is measured with the second lens group and the protective layer with a thickness $t_2$ arranged along one optical axis and with an optical axis of the first lens group tilted 5 minutes to an optical axis of the second lens group, satisfy the following expressions (10) and (11), it is possible to judge that the aberration correcting element L1 and the light converging element L2 have been designed so that an amount of wavefront aberration satisfies the expressions (1), (2) and (3) above;

$$W_{T1} = W_{C5} - W_{C1} < 0.02 \; \lambda RMS \; (\lambda = \lambda_1) \quad (10)$$

$$W_{T2} = W_{C6} - W_{C3} > 0.02 \; \lambda RMS \; (\lambda = \lambda_2) \quad (11)$$

Herein each of the $W_{T1}$ and $W_{T2}$ represents wavefront aberration from which defocus components are removed, and the $W_{T1}$ is to be measured including the thickness $t_1$, while, the $W_{T2}$ is to be measured including the thickness $t_2$.

In above expressions, $W_{T1}$ represent a difference between $W_{C5}$ and $W_{C1}$, and $W_{T2}$ represent a difference between $W_{C6}$ and $W_{C3}$.

Lens design is performed so that the following expression (7) is satisfied by the ratio of paraxial power $P_{L1}$ of the aberration correcting element L1 for the first light flux to paraxial power $P_{L2}$ of the light converging element L2 for the first light flux.

$$|P_{L1}/P_{L2}| \leq 0.2 \quad (7)$$

As described above, it is possible to secure sufficient working distance for DVD by making the light converging element L2 arranged on the optical disk side to have refracting power for the incident light flux with wavelength $\lambda_1$ exclusively. Further, the diffractive structure having steps in the optical axis direction is formed on the optical surface of the aberration correcting element L1, and therefore, a rate of the light flux whose traveling route is intercepted by the step portion and does not contribute to formation of a light-converged spot can be controlled, and a decline of transmittance can be prevented.

Figure 7:
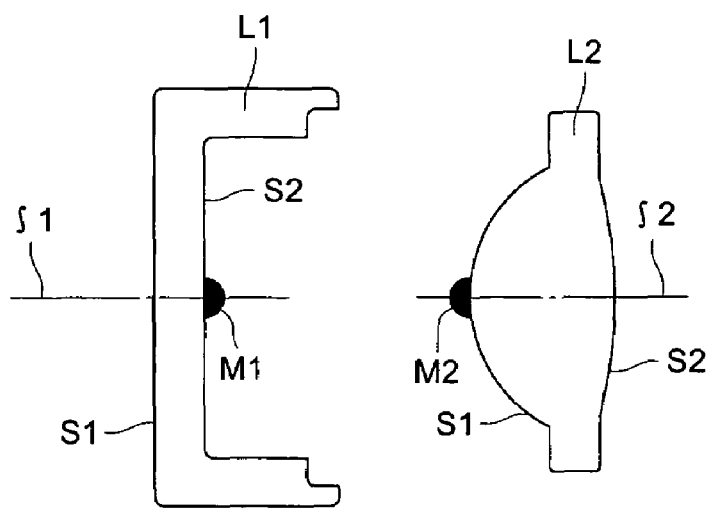
FIG. 7(a) is a side view and FIG. 7(b) is a front view both for illustrating the structure of a positioning mark.
Figure 7:
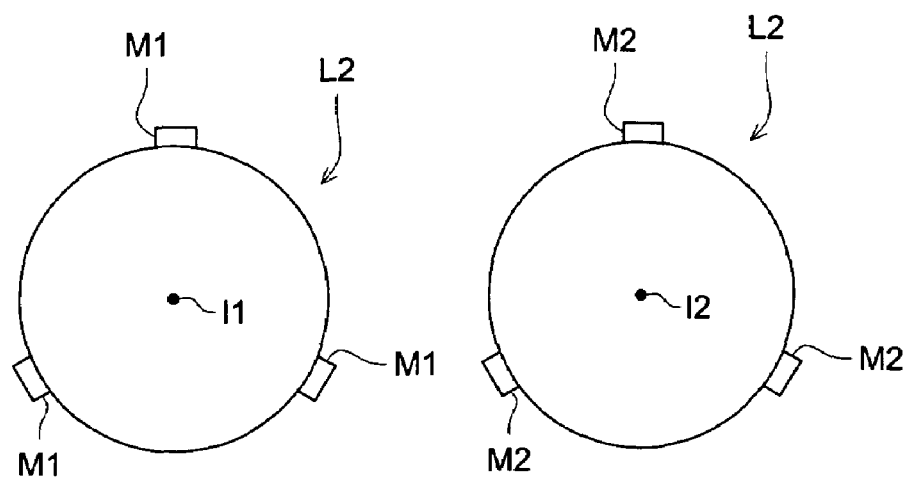

Further, as shown in FIG. 7(a), positioning marks M1 and M2 for aligning optical axes are formed respectively on the aberration correcting element L1 and the light converging element L2.

To be concrete, protrusions M1 and M2 both representing positioning marks are formed respectively on optical axis 11 of plane of emergence S2 of the aberration correcting element L1 and on optical axis 12 of plane of incidence S1 of the light converging element L2, and by moving the light converging element L2 relatively to the aberration correcting element L1 while confirming visually the protrusions M1 and M2 through the light converging element L2 from the plane of emergence S2 of the light converging element L2, under the state of irradiating light from the side, and by superposing the protrusion M2 on the protrusion M1, thereby, the aberration correcting element L1 and the light converging element L2 can be positioned, under the condition that the optical axis 11 agrees in terms of position with the optical axis 12. Incidentally, the positioning marks M1 and M2 formed on optical axes are in sizes having no influence on optical functions of respective optical elements.

Further, as shown in FIG. 7(b), plural positioning marks M1 and plural positioning marks M2 may also be provided respectively on sides of the aberration correcting element L1 and the light converging element L2. In this case, the optical axis 11 of the aberration correcting element L1 and the optical axis 12 of the light converging element L2 can be made to agree in terms of position, and relative positioning in the circumferential direction having its center on the optical axis is possible.

Incidentally, though the aberration correcting element L1 in the present embodiment has the structure wherein diffractive structure HOE is formed on optical surface S1 on the semiconductor laser light source side and diffractive structure DOE is formed on optical surface S2 on the optical disk side, it is also possible to employ the structure wherein the diffractive structure DOE is formed on the optical surface S1 and the diffractive structure HOE is formed on the optical surface S2, which is opposite to the foregoing.

The collimator lens COL is constructed so that its position can be moved in the optical axis direction by uniaxial actuator AC2, and chromatic aberration caused between the first wavelength $\lambda_1$ and the second wavelength $\lambda_2$ is absorbed, and a light flux with any wavelength can emerge from collimator lens COL in the state of a parallel light flux. Further, by moving collimator lens COL in the optical axis direction in the case of conducting recording and reproducing of information for high density optical disc HD, it is possible to correct spherical aberration of the spot formed on information recording surface RL1 of high density optical disc HD, and thereby, excellent recording and reproducing characteristics for the high density optical disc HD can be maintained constantly.

Causes for generation of spherical aberration that is corrected by positional adjustment of collimator lens COL include, for example, wavelength dispersion caused by errors in manufacture of violet semiconductor laser LD1, changes and distribution of refractive index of objective optical system OBJ caused by temperature changes, focus jump between layers in recording and reproducing for multi-layer disc such as 2-layer disk and 4-layer disk and dispersion and distribution of thickness caused by manufacturing errors for protective layer PL1.

In the explanation above, there has been explained an occasion wherein spherical aberration of a spot formed on information recording surface RL1 of high density optical disc HD is corrected. However, it is also possible to correct spherical aberration of a spot formed on information recording surface RL2 of DVD through positional adjustment of collimator lens COL.

Incidentally, it is possible to obtain an optical information recording and reproducing apparatus capable of conducting at least one of recording optical information for an optical disk and reproducing of information recorded on an optical disk, by providing optical pickup apparatus PU1 shown in the embodiment above, a driving and rotating device that holds an optical disk rotatably and a control device that controls driving of these various apparatuses.

EXAMPLES

Next, examples of the objective optical system capable of being used in the aforesaid embodiment will be explained. Incidentally, when optical surfaces of the objective optical system in the following example are formed to be aspheric surfaces, each aspheric surface has a form of aspheric surface expressed by the following Numeral 1, wherein X (mm) represents an amount of deformation from a plane that is tangent to the optical surface at its vertex, h (mm) represents a height in the direction perpendicular to the optical axis, r (mm) represents a paraxial radius of curvature, κ represents a conic constant and $A_{2i}$ represents an aspheric surface coefficient.

$$x = \frac{h^2/r}{1+\sqrt{1-(1+\kappa)(h/r)^2}} + \sum_{i=2} A_{2i} h^{2i} \quad \text{(Numeral 1)}$$

Further, a diffractive structure formed on an aberration correcting element is expressed by an optical path difference that is added to a transmission wavefront by the diffractive structure. The optical path difference of this kind is expressed by optical path difference function $\Phi_b$ (mm) that is defined by the following Numeral 2, when h (mm) represents a height in the direction perpendicular to the optical axis, $B_{2j}$ represents an optical path difference function coefficient, λ (nm) represents a wavelength of an incident light flux, $\lambda_B$ (nm) represents a manufacture wavelength, and dor represents the diffraction order of diffracted light having the maximum diffraction efficiency among diffracted light generated by the diffractive structure when a light flux having wavelength λ enters.

$$\phi_b = \lambda/\lambda_B \times dor \times \sum_{j=1} B_{2j} h^{2j} \quad \text{(Numeral 2)}$$

Example 1

Figure 8:
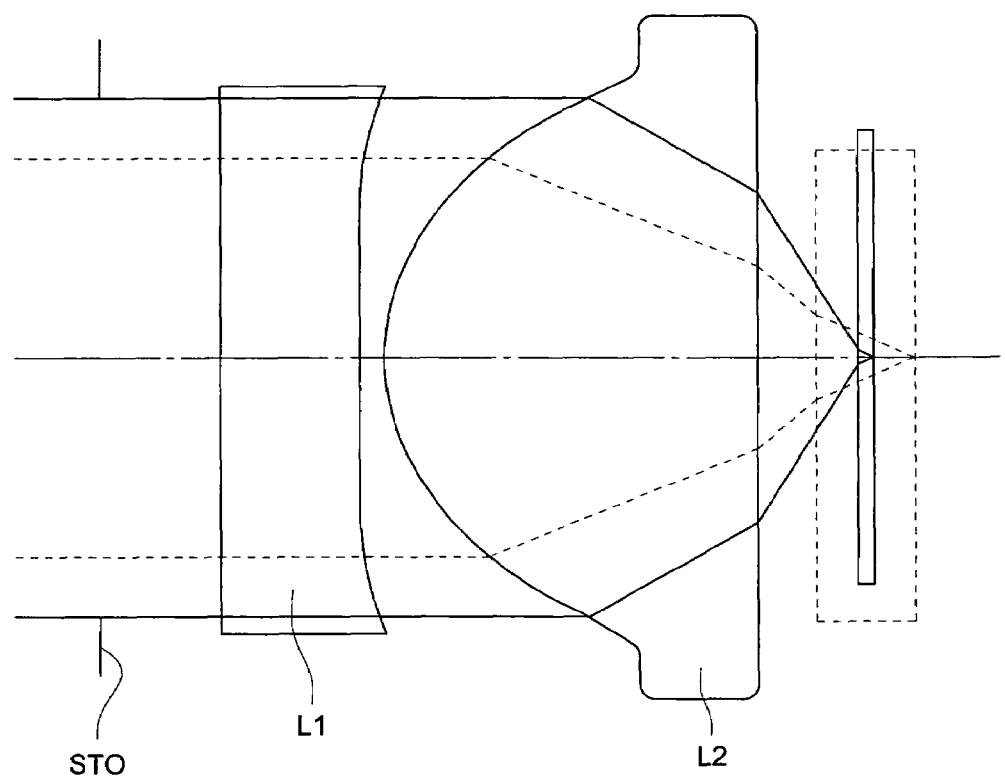
FIG. 8 is a sectional view of a lens in Example.

The present example is an objective lens unit including an aberration correcting element and a light converging element and having compatibility for high density optical disc and DVD. Each of the aberration correcting element and the light converging element is a plastic lens. Incidentally, the light converging element is one exclusively for high density optical disc HD. Lens data related to the present example are shown in Tables (1-1) and (1-2), and its lens sectional view is shown in FIG. 8.

TABLE 1-1

(Optical specifications)
HD: $NA_1 = 0.85$, $f_1 = 2.000$ mm, $\lambda_1 = 408$ nm, $M_1 = 0$, $t_1 = 0.0875$ mm
DVD: $NA_2 = 0.60$, $f_2 = 2.084$ mm, $\lambda_2 = 658$ nm, $M_2 = 0$, $t_2 = 0.6$ mm (Paraxial data)

| Surface No. | r (mm) | d1 (mm) | d2 (mm) | $N\lambda_1$ | $N\lambda_2$ | νd | Remarks |
|---|---|---|---|---|---|---|---|
| OBJ | ∞ | | | | | | *2 |
| STO | | 0.5000 | 0.5000 | | | | *3 |
| 1 | *1 | 1.0000 | 1.0000 | 1.5242 | 1.5064 | 56.5 | *4 |
| 2 | *1 | 0.1000 | 0.1000 | | | | |
| 3 | 1.3156 | 2.3500 | 2.3500 | 1.5596 | 1.5406 | 56.3 | *5 |
| 4 | −2.6935 | 0.6640 | 0.4497 | | | | |
| 5 | ∞ | 0.0875 | 0.6000 | 1.6211 | 1.5798 | 30.0 | *6 |
| 6 | ∞ | | | | | | |

(Paraxial radius of curvature for each of the first second surfaces, aspheric surface coefficient, diffraction order, manufacturing wavelength, optical path difference function coefficient)

| | First surface | | Second surface | |
|---|---|---|---|---|
| | 0 ≦ h ≦ 1.26 | 1.26 ≦ h | 0 ≦ h ≦ 1.26 | 1.26 ≦ h |
| r | ∞ | ∞ | 20.8798 | 19.7183 |
| κ | 0.0000E+00 | 0.0000E+00 | 5.0956E+01 | 4.4456E+00 |
| A4 | 0.0000E+00 | 0.0000E+00 | 1.0336E−03 | 1.3107E−03 |
| A6 | 0.0000E+00 | 0.0000E+00 | 8.5090E−04 | 5.5453E−04 |
| A8 | 0.0000E+00 | 0.0000E+00 | 2.1984E−04 | 4.3192E−05 |
| A10 | 0.0000E+00 | 0.0000E+00 | −5.6827E−05 | 7.8824E−05 |
| dor | +0/+1 | — | +2/+1 | +2/+1 |
| λB | 658 nm | — | 390 nm | 408 nm |
| B2 | 5.1500E−03 | 0.0000E+00 | −6.0000E−03 | −6.5080E−03 |
| B4 | −1.4410E−03 | 0.0000E+00 | −4.6351E−04 | −6.0710E−04 |
| B6 | −5.0546E−05 | 0.0000E+00 | −1.8082E−04 | 6.0292E−07 |
| B8 | −1.5857E−04 | 0.0000E+00 | −8.6806E−05 | −4.9997E−05 |
| B10 | 1.2455E−05 | 0.0000E+00 | 2.2031E−05 | −1.6906E−05 |

*1: (Lower table)
*2: Luminous point
*3: Diaphragm
*4: Aberration correcting element
*5: Light converging element
*6: Protective layer

TABLE 1-2

(Aspheric surface coefficient of Third surface and Fourth surface)

| | Third surface | Fourth surface |
|---|---|---|
| κ | −0.6677E+00 | −0.4265E+02 |
| A4 | 0.1094E−01 | 0.1292E+00 |
| A6 | 0.1198E−02 | −0.1725E+00 |
| A8 | 0.3188E−02 | 0.1609E+00 |
| A10 | −0.2625E−02 | −0.9634E−01 |
| A12 | 0.8605E−03 | 0.3157E−01 |
| A14 | 0.6914E−03 | −0.4291E−02 |
| A16 | −0.7048E−03 | 0.0000E+00 |
| A18 | 0.2356E−03 | 0.0000E+00 |
| A20 | −0.2819E−04 | 0.0000E+00 |

Incidentally, in Tables (1-1) and (1-2), E (for example, 2.5 E-03) is used to express exponent of 10 (for example, $2.5 \times 10^{-03}$).

Further, in Tables (1-1) and (1-2), $NA_1$ represents a numerical aperture of high density optical disc HD, $NA_2$ represents a numerical aperture of DVD, $f_1$ (mm) represents a focal length for first wavelength $\lambda_1$, $f_2$ (mm) represents a focal length for second wavelength $\lambda_2$, $\lambda_1$ (nm) represents a working wavelength for high density optical disc, $\lambda_2$ (nm) represents a working wavelength for DVD, $M_1$ represents a magnification for first wavelength $\lambda_1$, $M_2$ represents a magnification for second wavelength $\lambda_2$, $t_1$ (mm) represents a protective layer thickness of high density optical disc HD, $t_2$ (mm) represents a protective layer thickness of DVD, r (mm) represents a paraxial radius of curvature, $d_1$ (mm) represents a spacing of planes for first wavelength $\lambda_1$, $d_2$ (mm) represents a spacing of planes for second wavelength $\lambda_2$, $N_{\lambda 1}$, represents a refractive index for first wavelength $\lambda_1$, $N_{\lambda 2}$ represents a refractive index for second wavelength $\lambda_2$, $\upsilon d$ represents Abbe's number and dor represents a diffraction order.

Further, values corresponding to expressions (1)-(11) for the objective optical system of the present example are shown below. When calculating these wavefront aberration values, light flux diameter $\phi_1$ of 3.4 mm was used for the incident parallel light flux with first wavelength $\lambda_1$ and light flux diameter $\phi_2$ of 2.5 mm was used for the incident parallel light flux with second wavelength $\lambda_2$.

$$W_{L1\lambda 1} = 0.000\lambda RMS\ (\lambda = 408\ nm) \tag{1}$$

$$W_{L2\lambda 1} = 0.002\lambda RMS\ (\lambda = 408\ nm) \tag{2}$$

$$M = 0 \tag{3}$$

$$W_{L2\lambda 2} = 0.618\lambda RMS\ (\lambda = 658\ nm) \tag{4}$$

$$W_{OBJ\lambda 1} = 0.000\lambda RMS\ (\lambda = 408\ nm) \tag{5}$$

$$W_{OBJ\lambda 2} = 0.000\lambda RMS\ (\lambda = 658\ nm) \tag{6}$$

$$|P_{L1}/P_{L2}| = 0 \tag{7}$$

$$W_{S1} = 0.000\lambda RMS\ (\lambda = 408\ nm) \tag{8}$$

$$W_{S2} = 0.028\lambda RMS\ (\lambda = 658\ nm) \tag{9}$$

$$W_{T1} = W_{C5} - W_{C1} < 0.02\lambda RMS\ (\lambda = \lambda_1) \tag{10}$$

$$W_{T2} = W_{C6} - W_{C3} > 0.02\lambda RMS\ (\lambda = \lambda_2) \tag{11}$$

Example 2

The present example is an objective lens unit including an aberration correcting element and a light converging element and having compatibility for high density optical disc HD, DVD and CD. The aberration correcting element is a plastic lens and the light converging element is a glass ("BACD5" by HOYA Co.) lens. Incidentally, the light converging element is used exclusively for high density optical disc HD. Lens data related to the present example are shown in Tables (2-1) and (2-2).

TABLE 2-1

(Optical specifications)
HD: NA1 = 0.85, f1 = 2.200 mm, λ1 = 405 nm, M1 = 0, t1 = 0.1 mm
DVD: NA2 = 0.65, f2 = 2.319 mm, λ2 = 655 nm, M2 = 0, t2 = 0.6 mm
CD: NA3 = 0.45, f3 = 2.622 mm, λ3 = 785 nm, M3 = 0, t3 = 1.2 mm
(Paraxial data)

| Surface No. | r (mm) | d1 (mm) | d2 (mm) | d3 (mm) | $N\lambda_1$ | $N\lambda_2$ | $N\lambda_3$ | νd | Remarks |
|---|---|---|---|---|---|---|---|---|---|
| OBJ | | ∞ | ∞ | ∞ | | | | | *2 |
| STO | | 0.1000 | 0.1000 | 0.1000 | | | | | *3 |
| 1 | *1 | 1.1000 | 1.1000 | 1.1000 | 1.51547 | 1.49729 | 1.49378 | 55.0 | *4 |
| 2 | *1 | 0.5000 | 0.5000 | 0.5000 | | | | | |
| 3 | 1.5098 | 2.5900 | 2.5900 | 2.5900 | 1.60526 | 1.58624 | 1.58239 | 61.3 | *5 |
| 4 | −3.9871 | 0.7150 | 0.7150 | 0.7150 | | | | | |
| 5 | ∞ | 0.1000 | 0.6000 | 1.2000 | 1.62230 | 1.57995 | 1.57326 | 30.0 | *6 |
| 6 | ∞ | | | | | | | | |

*1: (Lower table)
*2: Luminous point
*3: Diaphragm
*4: Aberration correcting element
*5: Light converging element
*6: Protective layer

TABLE 2-2

(Paraxial radius of curvature for each of the first second surfaces, aspheric surface coefficient, diffraction order, manufacturing wavelength, optical path difference function coefficient)

| | First surface | | Second surface | |
|---|---|---|---|---|
| | 0 ≦ h ≦ 1.385 | 1.385 ≦ h | 0 ≦ h ≦ 1.12 | 1.12 ≦ h |
| r | ∞ | ∞ | ∞ | ∞ |
| κ | 0.0000E+00 | 0.0000E+00 | 0.0000E+00 | 0.0000E+00 |
| A4 | 0.0000E+00 | 0.0000E+00 | 0.0000E+00 | 0.0000E+00 |
| A6 | 0.0000E+00 | 0.0000E+00 | 0.0000E+00 | 0.0000E+00 |
| A8 | 0.0000E+00 | 0.0000E+00 | 0.0000E+00 | 0.0000E+00 |
| A10 | 0.0000E+00 | 0.0000E+00 | 0.0000E+00 | 0.0000E+00 |
| dor | +0/+1/+0 | — | +0/+0/+1 | — |
| λB | 655 nm | — | 785 nm | — |
| B2 | 2.5518e−02 | 0.0000E+00 | 5.3790E−02 | 0.0000E+00 |
| B4 | −5.4893e−04 | 0.0000E+00 | −3.6593e−03 | 0.0000E+00 |
| B6 | 1.0566e−03 | 0.0000E+00 | 7.3831e−03 | 0.0000E+00 |
| B8 | −4.0396e−04 | 0.0000E+00 | −4.7865e−03 | 0.0000E+00 |
| B10 | 1.3935e−04 | 0.0000E+00 | 2.0033e−03 | 0.0000E+00 |

TABLE 2-3

(Aspheric surface coefficient of Third surface and Fourth surface)

|   | Third surface | Fourth surface |
|---|---|---|
| κ | −0.660911 | −70.338236 |
| A4 | 0.794125E−02 | 0.991271E−01 |
| A6 | 0.864158E−04 | −.108729E+00 |
| A8 | 0.203333E−02 | 0.805135E−01 |
| A10 | −.126982E−02 | −.407820E−01 |
| A12 | 0.285379E−03 | 0.116322E−01 |
| A14 | 0.217201E−03 | −.139675E−02 |
| A16 | −.168470E−03 | 0.0000E+00 |
| A18 | 0.450320E−04 | 0.0000E+00 |
| A20 | −.444325E−05 | 0.0000E+00 |

Incidentally, in Tables (2-1) through (2-3), E (for example, 2.5 E-03) is used to express exponent of 10 (for example, $2.5 \times 10^{-03}$).

Further, in Tables (2-1) through (2-3), $NA_1$ represents a numerical aperture of high density optical disc HD, $NA_2$ represents a numerical aperture of DVD, $NA_3$ represents a numerical aperture of CD, $f_1$ (mm) represents a focal length for first wavelength $\lambda_1$, $f_2$ (mm) represents a focal length for second wavelength $\lambda_2$, $f_3$ (mm) represents a focal length for third wavelength $\lambda_3$, $\lambda_1$ (nm) represents a working wavelength for high density optical disc, $\lambda_2$ (nm) represents a working wavelength for DVD, $\lambda_3$ (nm) represents a working wavelength for CD, $M_1$ represents a magnification for first wavelength $\lambda_1$, $M_2$ represents a magnification for second wavelength $\lambda_2$, $M_3$ represents a magnification for third wavelength $\lambda_3$, $t_1$ (mm) represents a protective layer thickness of high density optical disc HD, $t_2$ (mm) represents a protective layer thickness of DVD, $t_3$ (mm) represents a protective layer thickness of CD, r (mm) represents a paraxial radius of curvature, $d_1$ (mm) represents a spacing of planes for first wavelength $\lambda_1$, $d_2$ (mm) represents a spacing of planes for second wavelength $\lambda_2$, $d_3$ (mm) represents a spacing of planes for third wavelength $\lambda_3$, $N_{\lambda 1}$ represents a refractive index for first wavelength $\lambda_1$, $N_{\lambda 2}$ represents a refractive index for second wavelength $\lambda_2$, $N_{\lambda 3}$ represents a refractive index for third wavelength $\lambda_3$, νd represents Abbe's number and dor represents a diffraction order.

Further, values corresponding to expressions (1)-(11) for the objective optical system of the present example are shown below. When calculating these wavefront aberration values, light flux diameter $\phi_1$ of 3.74 mm was used for the incident parallel light flux with first wavelength $\lambda_1$ and light flux diameter $\phi_2$ of 2.77 mm was used for the incident parallel light flux with second wavelength $\lambda_2$.

| (1) | $W_{L1\lambda 1}$ = 0.000 λ RMS | (λ = 405 nm) |
|---|---|---|
| (2) | $W_{L2\lambda 1}$ = 0.003 λ RMS | (λ = 405 nm) |
| (3) | M = 0 | |
| (4) | $W_{L2\lambda 2}$ = 0.623 λ RMS | (λ = 655 nm) |
| (5) | $W_{OBJ\lambda 1}$ = 0.003 λ RMS | (λ = 405 nm) |
| (6) | $W_{OBJ\lambda 2}$ = 0.002 λ RMS | (λ = 655 nm) |
| (7) | $|P_{L1}/P_{L2}|$ = 0 | |
| (8) | $W_{S1}$ = 0.000 λ RMS | (λ = 405 nm) |
| (9) | $W_{S2}$ = 0.031 λ RMS | (λ = 655 nm) |
| (10) | $W_{T1}$ = 0.001 λ RMS | (λ = 405 nm) |
| (11) | $W_{T2}$ = 0.003 λ RMS | (λ = 655 nm) |

What is claimed is:

1. An objective optical system for use in an optical pickup apparatus for converging a first parallel light flux with a diameter $\phi_1$ and a first wavelength $\lambda_1$ on an information recording surface of a first optical disk having a protective layer with a thickness $t_1$ within a numerical aperture $NA_1$, and converging a second parallel light flux with a diameter $\phi_2$ ($\phi_2 < \phi_1$) and a second wavelength $\lambda_2$ ($\lambda_2 > \lambda_1$) on an information recording surface of a second optical disk having a protective layer with a thickness $t_2$ ($t_2 > t_1$) within a numerical aperture $NA_2$ ($NA_2 < NA_1$), the objective optical system comprising:

a first lens group having a phase structure; and a second lens group, wherein the first lens group and the second lens group are arranged in the objective optical system in this order from a longer conjugate distance side of the objective optical system, and the objective optical system satisfies following expressions:

$$W_{L1\lambda 1} \leq 0.05 \; \lambda RMS(\lambda = \lambda_1) \qquad (1)$$

$$W_{L2\lambda 1} \leq 0.05 \; \lambda RMS(\lambda = \lambda_1) \qquad (2)$$

$$-0.03 \leq M \leq 0.13 \qquad (3)$$

$$W_{L2\lambda 2} > 0.30 \; \lambda RMS(\lambda = \lambda_2) \qquad (4)$$

$$W_{OBJ\lambda 2} \leq 0.05 \; \lambda RMS(\lambda = \lambda_2) \qquad (6)$$

where $W_{L1\lambda 1}$ is a wavefront aberration of the first lens group when the first parallel light flux enters into the first lens group, $W_{L2\lambda 1}$ is a wavefront aberration of the second lens group within the numerical aperture $NA_1$ for the first parallel light flux, M is a magnification of the second lens group when $W_{L2\lambda 1}$ has a minimum value, $W_{L2\lambda 2}$ is a wavefront aberration of the second lens group whose magnification is M, within the numerical aperture $NA_2$ for the second parallel light flux, and $W_{OBJ\lambda 2}$ is a wavefront aberration of the objective optical system within the numerical aperture $NA_2$ when the second parallel light flux enters into the objective optical system, wherein each of $W_{L2\lambda 1}$, $W_{L2\lambda 2}$, and $W_{OBJ\lambda 2}$ is a wavefront aberration whose defocus component is removed, $W_{L2\lambda 1}$ is measured with the protective layer having a thickness $t_1$ included, and each of $W_{L2\lambda 2}$ and $W_{OBJ\lambda 2}$ is measured with the protective layer having a thickness $t_2$ included, wherein the objective optical system further satisfies $$|P_{L1}/P_{L2}| \leq 0.2 \qquad (7)$$

where $P_{L1}$ is a paraxial power of the first lens group for the first parallel light flux, and $P_{L2}$ is a paraxial power of the second lens group for the first parallel light flux, and wherein the objective optical system further satisfies following expressions:

$$W_{S1} = W_{C2} - W_{C1} < 0.01 \; \lambda RMS(\lambda = \lambda_1) \qquad (8)$$

$$W_{S2} = W_{C4} - W_{C3} > 0.02 \; \lambda RMS(\lambda = \lambda_2) \qquad (9)$$

where $W_{C1}$ is a coma amount of the objective optical system within the numerical aperture $NA_1$ for the first parallel light flux and is measured with the first lens group, the second lens group and the protective layer with a thickness $t_1$ arranged along one optical axis, $W_{C2}$ is a coma amount of the objective optical system within the numerical aperture $NA_1$ for the first parallel light flux and is measured with the second lens group and the protective layer with a thickness $t_1$ arranged along one optical axis and with an optical axis of the first lens group shifted 10 μm to an optical axis of the second lens group, where $W_{C3}$ is a coma amount of the objective optical system within the numerical aperture $NA_2$ for the second parallel light flux and is measured with the first lens group, the second lens group and the protective layer with a thickness $t_2$ arranged along one optical axis, $W_{C4}$ is a coma amount of the objective optical system within the numerical aperture $NA_2$ for the second parallel light flux and is measured with the second lens group and the protective layer with a thickness $t_2$ arranged along one optical axis and with an optical axis of the first lens group shifted 10 μm to an optical axis of the second lens group, $W_{S1}$ is a difference between $W_{C1}$ and $W_{C2}$, and $W_{S1}$ is a difference between $W_{C3}$ and $W_{C4}$.

2. The objective optical system of claim 1, wherein the objective optical system satisfies a following expression:

$$W_{OBJ\lambda 1} \leq 0.05 \, \lambda RMS(\lambda=\lambda_1) \tag{5}$$

where $W_{OBJ\lambda 1}$ is a wavefront aberration of the objective optical system within the numerical aperture $NA_1$ when the first parallel light flux enters into the objective optical system, wherein $W_{OBJ\lambda 1}$ is a wavefront aberration whose defocus component is removed and $W_{OBJ\lambda 1}$ is measured with the protective layer having a thickness $t_1$ included.

3. An objective optical system for use in an optical pickup apparatus for converging a first parallel light flux with a diameter $\phi_1$ and a first wavelength $\lambda_1$ on an information recording surface of a first optical disk having a protective layer with a thickness $t_1$ within a numerical aperture $NA_1$, and converging a second parallel light flux with a diameter $\phi_2$ ($\phi_2<\phi_1$) and a second wavelength $\lambda_2$ ($\lambda_2>\lambda_1$) on an information recording surface of a second optical disk having a protective layer with a thickness $t_2$ ($t_2>t_1$) within a numerical aperture $NA_2$ ($NA_2<NA_1$), the objective optical system comprising:

a first lens group having a phase structure; and a second lens group, wherein the first lens group and the second lens group are arranged in the objective optical system in this order from a longer conjugate distance side of the objective optical system, and the objective optical system satisfies following expressions:

$$W_{L1\lambda 1} \leq 0.05 \, \lambda RMS(\lambda=\lambda_1) \tag{1}$$

$$W_{L2\lambda 1} \leq 0.05 \, \lambda RMS(\lambda=\lambda_1) \tag{2}$$

$$-0.03 \leq M \leq 0.13 \tag{3}$$

$$W_{L2\lambda 2} > 0.30 \, \lambda RMS(\lambda=\lambda_2) \tag{4}$$

$$W_{OBJ\lambda 2} \leq 0.05 \, \lambda RMS(\lambda=\lambda_2) \tag{6}$$

where $W_{L1\lambda 1}$ is a wavefront aberration of the first lens group when the first parallel light flux enters into the first lens group, $W_{L2\lambda 1}$ is a wavefront aberration of the second lens group within the numerical aperture $NA_1$ for the first parallel light flux, M is a magnification of the second lens group when $W_{L2\lambda 1}$ has a minimum value, $W_{L2\lambda 2}$ is a wavefront aberration of the second lens group whose magnification is M, within the numerical aperture $NA_2$ for the second parallel light flux, and $W_{OBJ\lambda 2}$ is a wavefront aberration of the objective optical system within the numerical aperture $NA_2$ when the second parallel light flux enters into the objective optical system, wherein each of $W_{L2\lambda 1}$, $W_{L2\lambda 2}$, and $W_{OBJ\lambda 2}$ is a wavefront aberration whose defocus component is removed, $W_{L2\lambda 1}$ is measured with the protective layer having a thickness $t_1$ included, and each of $W_{L2\lambda 2}$ and $W_{OBJ\lambda 2}$ is measured with the protective layer having a thickness $t_2$ included, wherein the objective optical system further satisfies $$|P_{L1}/P_{L2}| \leq 0.2 \tag{7}$$

where $P_{L1}$ is a paraxial power of the first lens group for the first parallel light flux, and $P_{L2}$ is a paraxial power of the second lens group for the first parallel light flux, and wherein the objective optical system further satisfies following expressions:

$$W_{T1}=W_{C5}-W_{C1}<0.02 \, \lambda RMS(\lambda=\lambda_1) \tag{10}$$

$$W_{T2}=W_{C6}-W_{C3} \leq 0.02 \, \lambda RMS(\lambda=\lambda_2) \tag{11}$$

where $W_{C1}$ is a coma amount of the objective optical system within the numerical aperture $NA_1$ for the first parallel light flux and is measured with the first lens group, the second lens group and the protective layer with a thickness $t_1$ arranged along one optical axis, $W_{C5}$ is a coma amount of the objective optical system within the numerical aperture $NA_1$ for the first parallel light flux and is measured with the second lens group and the protective layer with a thickness $t_1$ arranged along one optical axis arranged and with an optical axis of the first lens group tilted 5 minutes to an optical axis of the second lens group, where $W_{C3}$ is a coma amount of the objective optical system within the numerical aperture $NA_2$ for the second parallel light flux and is measured with the first lens group, the second lens group and the protective layer with a thickness $t_2$ arranged along one optical axis, $W_{C6}$ is a coma amount of the objective optical system within the numerical aperture $NA_2$ for the second parallel light flux and is measured with the second lens group and the protective layer with a thickness $t_2$ arranged along one optical axis and with an optical axis of the first lens group tilted 5 minutes to an optical axis of the second lens group, $W_{T1}$ is a difference between $W_{C5}$ and $W_{C1}$, and $W_{T2}$ is a difference between $W_{C6}$ and $W_{C3}$.

4. The objective optical system of claim 1, wherein each of the first lens group and the second lens group comprises a positioning mark for an optical axis alignment and the first lens group and the second lens group are positioned each other by the positioning marks.

5. The objective optical system of claim 1, wherein the phase structure corrects a spherical aberration which is caused in the second lens group due to a difference between the protective layer thickness $t_1$ of the first optical disk and the protective layer thickness $t_2$ of the second optical disk.

6. The objective optical system of claim 1, wherein the phase structure is a diffractive structure or an optical path difference providing structure.

7. The objective optical system of claim 1 for use in the optical pickup apparatus which satisfies following expressions:

$$350 \text{ nm} < \lambda_1 < 420 \text{ nm} \tag{12}$$

$$630 \text{ nm} < \lambda_2 < 680 \text{ nm} \tag{13}$$

$$0 \text{ mm} \leq t_1 \leq 0.2 \text{ mm} \tag{14}$$

$$0.55 \text{ mm} \leq t_2 \leq 0.65 \text{ mm} \tag{15}$$

$$0.8 < NA_1 < 0.9 \tag{16}$$

$$0.55 < NA_2 < 0.7 \tag{17}.$$

8. An optical pickup apparatus comprising:
a first light source for emitting a first parallel light flux with a first wavelength $\lambda_1$ and a diameter $\phi_1$;
a second light source for emitting a second parallel light flux with a second wavelength $\lambda_2$ ($\lambda_2 > \lambda_1$) and a diameter $\phi_2$ ($\phi_2 < \phi_1$); and
an objective optical system of claim 1 for converging the first parallel light flux on an information recording surface of a first optical disk having a protective layer with a thickness $t_1$ within a numerical aperture $NA_1$, and for converging the second parallel light flux on an information recording surface of a second optical disk having a protective layer with a thickness $t_2$ ($t_2 > t_1$) within a numerical aperture $NA_2$ ($NA_2 < NA_1$).

9. An optical information recording and/or reproducing apparatus comprising an optical pickup apparatus of claim 8.

10. The objective optical system of claim 3, wherein the objective optical system satisfies a following expression:

$$W_{OBJ,\lambda 1} \leq 0.05 \, \lambda RMS (\lambda = \lambda_1) \tag{5}$$

where $W_{OBJ,\lambda 1}$ is a wavefront aberration of the objective optical system within the numerical aperture $NA_1$ when the first parallel light flux enters into the objective optical system,
wherein $W_{OBJ,\lambda 1}$ is a wavefront aberration whose defocus component is removed and $W_{OBJ,\lambda 1}$ is measured with the protective layer having a thickness $t_1$ included.

11. The objective optical system of claim 3, wherein each of the first lens group and the second lens group comprises a positioning mark for an optical axis alignment and the first lens group and the second lens group are positioned relative to each other by the positioning marks.

12. The objective optical system of claim 3, wherein the phase structure corrects a spherical aberration which is caused in the second lens group due to a difference between the protective layer thickness $t_1$ of the first optical disk and the protective layer thickness $t_2$ of the second optical disk.

13. The objective optical system of claim 3, wherein the phase structure is a diffractive structure or an optical path difference providing structure.

14. The objective optical system of claim 3 for use in the optical pickup apparatus which satisfies following expressions:

$$350 \text{ nm} < \lambda_1 < 420 \text{ nm} \tag{12}$$

$$630 \text{ nm} < \lambda_2 < 680 \text{ nm} \tag{13}$$

$$0 \text{ mm} \leq t_1 \leq 0.2 \text{ mm} \tag{14}$$

$$0.55 \text{ mm} \leq t_2 \leq 0.65 \text{ mm} \tag{15}$$

$$0.8 < NA_1 < 0.9 \tag{16}$$

$$0.55 < NA_2 < 0.7 \tag{17}.$$

15. An optical pickup apparatus comprising:
a first light source for emitting a first parallel light flux with a first wavelength $\lambda_1$ and a diameter $\phi_1$;
a second light source for emitting a second parallel light flux with a second wavelength $\lambda_2$ ($\lambda_2 > \lambda_1$) and a diameter $\phi_2$ ($\phi_2 < \phi_1$); and
the objective optical system of claim 3 for converging the first parallel light flux on an information recording surface of a first optical disk having a protective layer with a thickness $t_1$ within a numerical aperture $NA_1$, and for converging the second parallel light flux on an information recording surface of a second optical disk having a protective layer with a thickness $t_2$ ($t_2 > t_1$) within a numerical aperture $NA_2$ ($NA_2 < NA_1$).

16. An optical information recording and/or reproducing apparatus comprising an optical pickup apparatus of claim 15.

* * * * *